US009519858B2

(12) United States Patent
Zweig et al.

(10) Patent No.: US 9,519,858 B2
(45) Date of Patent: Dec. 13, 2016

(54) FEATURE-AUGMENTED NEURAL NETWORKS AND APPLICATIONS OF SAME

(71) Applicant: Microsoft Corporation, Redmond, WA (US)

(72) Inventors: Geoffrey G. Zweig, Sammamish, WA (US); Tomas Mikolov, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 13/763,701

(22) Filed: Feb. 10, 2013

(65) Prior Publication Data

US 2014/0229158 A1    Aug. 14, 2014

(51) Int. Cl.
*G06N 3/12*     (2006.01)
*G06N 3/08*     (2006.01)
*G06N 3/04*     (2006.01)
*G06F 17/28*    (2006.01)

(52) U.S. Cl.
CPC .............. *G06N 3/08* (2013.01); *G06F 17/2818* (2013.01); *G06N 3/04* (2013.01)

(58) Field of Classification Search
CPC .............. G06F 17/28; G06N 3/04; G06N 3/08
USPC ............................................................ 704/9
See application file for complete search history.

(56) References Cited

U.S. PATENT DOCUMENTS

| | | | | |
|---|---|---|---|---|
| 5,510,981 A | * | 4/1996 | Berger ................. | G06F 17/2827 704/2 |
| 5,729,694 A | * | 3/1998 | Holzrichter ............. | G10L 15/24 704/270 |
| 5,872,865 A | * | 2/1999 | Normile ............. | G06K 9/00711 382/165 |
| 6,453,308 B1 | * | 9/2002 | Zhao ...................... | G05B 17/02 702/24 |
| 6,463,423 B1 | * | 10/2002 | Wada ...................... | G06N 3/04 706/15 |

(Continued)

FOREIGN PATENT DOCUMENTS

DE    WO 2012/076306    *    6/2012    .............. G06N 3/04

OTHER PUBLICATIONS

Wang, X., McCallum, A., & Wei, X. (Oct. 2007). Topical n-grams: Phrase and topic discovery, with an application to information retrieval. In Data Mining, 2007. ICDM 2007. Seventh IEEE International Conference on (pp. 697-702). IEEE.*

(Continued)

*Primary Examiner* — Tammy Paige Goddard
*Assistant Examiner* — Edwin S Leland, III
(74) *Attorney, Agent, or Firm* — Alin Corie; Sandy Swain; Micky Minhas

(57) ABSTRACT

A system is described herein which uses a neural network having an input layer that accepts an input vector and a feature vector. The input vector represents at least part of input information, such as, but not limited to, a word or phrase in a sequence of input words. The feature vector provides supplemental information pertaining to the input information. The neural network produces an output vector based on the input vector and the feature vector. In one implementation, the neural network is a recurrent neural network. Also described herein are various applications of the system, including a machine translation application.

20 Claims, 16 Drawing Sheets

(56) References Cited

U.S. PATENT DOCUMENTS

| | | | | |
|---|---|---|---|---|
| 7,346,595 B2* | 3/2008 | Aoyama | ............... | G05D 1/0221 706/12 |
| 8,156,057 B2* | 4/2012 | Nugent | ................. | G06N 3/063 706/25 |
| 8,229,729 B2* | 7/2012 | Sarikaya | ............. | G06F 17/2818 704/2 |
| 9,000,918 B1* | 4/2015 | McLaughlin | ........ | G08B 13/122 340/540 |
| 9,117,227 B1* | 8/2015 | Agrawal | ............ | G06Q 30/0242 |
| 2002/0161747 A1* | 10/2002 | Li | ...................... | G06F 17/30017 |
| 2004/0204930 A1* | 10/2004 | Chang | ...................... | G10L 15/16 704/202 |
| 2007/0067153 A1* | 3/2007 | Nakagawa | ............ | G06F 17/273 704/4 |
| 2007/0106509 A1* | 5/2007 | Acero | ............... | G06F 17/30746 704/240 |
| 2007/0211064 A1* | 9/2007 | Buck | ..................... | G06N 99/005 345/519 |
| 2008/0123907 A1* | 5/2008 | Eura | .................. | G06K 9/00288 382/118 |
| 2008/0147485 A1* | 6/2008 | Osagami | ............ | G06Q 30/0202 705/7.31 |
| 2010/0114571 A1* | 5/2010 | Nagatomo | ........ | G06F 17/30026 704/235 |
| 2010/0172584 A1* | 7/2010 | Lukac | .................. | G06K 9/0061 382/167 |
| 2011/0072047 A1* | 3/2011 | Wang | ................ | G06F 17/30265 707/776 |
| 2011/0112837 A1* | 5/2011 | Kurki-Suonio | ......... | G10L 15/22 704/235 |
| 2011/0151971 A1* | 6/2011 | Altshuler | ................ | A63F 13/12 463/30 |
| 2012/0109651 A1* | 5/2012 | Chen | ................ | G06F 17/30616 704/240 |
| 2012/0114197 A1* | 5/2012 | Zhang | ................ | G06K 9/00221 382/118 |
| 2012/0150532 A1* | 6/2012 | Mirowski | ............... | G06F 17/28 704/9 |
| 2012/0233127 A1* | 9/2012 | Solmer | ............. | G06F 17/30073 707/661 |
| 2012/0308121 A1* | 12/2012 | Datta | .................. | G06F 17/3028 382/155 |
| 2013/0006954 A1* | 1/2013 | Nikoulina | ........... | G06F 17/2818 707/706 |
| 2013/0282635 A1* | 10/2013 | Dull | ......................... | G06N 3/08 706/25 |
| 2014/0006328 A1* | 1/2014 | Blanco | ................ | G06F 17/3087 706/46 |
| 2014/0095151 A1* | 4/2014 | Sakamoto | ............. | G06F 17/274 704/9 |
| 2014/0156340 A1* | 6/2014 | Kern | ....................... | G06Q 40/00 705/7.28 |
| 2014/0156411 A1* | 6/2014 | Murgai | .............. | G06Q 30/0251 705/14.58 |
| 2014/0180974 A1* | 6/2014 | Kennel | .................. | G06N 7/005 706/12 |

OTHER PUBLICATIONS

Bengio, Y., Ducharme, R., Vincent, P., & Janvin, C. (2003). A neural probabilistic language model. The Journal of Machine Learning Research, 3, 1137-1155.*

Mikolov, et al., "Recurrent Neural Network Based Language Model," retrieved at <<http://www.fit.vutbr.cz/research/groups/speech/publi/2010/mikolov_interspeech2010_IS100722.pdf>>, Proceedings of Interspeech 2010, Sep. 2010, pp. 1045-1048.

Mikolov, et al., "Extensions of Recurrent Neural Network Based Language Model," retrieved at <<http://ieeexplore.ieee.org/stamp/stamp.jsp?tp=&arnumber=5947611>>, Proceedings of the IEEE International Conference on Acoustics, Speech, and Signal Processing, May 2011, pp. 5528-5531.

Mikolov, et al., "Empirical Evaluation and Combination of Advanced Language Modeling Techniques," retrieved at <<http://research.microsoft.com/pubs/175560/InterSpeech-2011.PDF>>, Proceedings of Interspeech 2011, Aug. 2011, pp. 605-608.

Mikolov, et al., "Strategies for Training Large Scale Neural Network Language Models," retrieved at <<http://ieeexplore.ieee.org/stamp/stamp.jsp?arnumber=06163930>>, Proceedings of the IEEE Workshop on Automatic Speech Recognition and Understanding, Dec. 2011, pp. 196-201.

Bengio, et al., "A Neural Probabilistic Language Model,"retrieved at <<http://jmlr.csail.mit.edu/papers/volume3/bengio03a/bengio03a.pdf>>, Journal of Machine Learning Research, vol. 3, Feb. 2003, pp. 1137-1155.

Schwenk, Holger, "Continuous Space Language Models,"Journal of Computer Speech and Language, vol. 21, Issue 3, Jul. 2007, pp. 492-518.

Mnih, et al., "Three New Graphical Models for Statistical Language Modelling," retrieved at <<http://www.gatsby.ucl.ac.uk/~amnih/papers/threenew.pdf>>, Proceedings of the 24th International Conference on Machine Learning, Jun. 2007, pp. 641-648.

Le, et al., "Structured Output Layer Neural Network Language Model," retrieved at <<http://ieeexplore.ieee.org/stamp/stamp.jsp?tp=&arnumber=5947610>>, Proceedings of the IEEE International Conference on Acoustics, Speech, and Signal Processing, May 2011, pp. 5524-5527.

Bengio, et al., "Learning Long-Term Dependencies with Gradient Descent is Difficult," retrieved at <<http://www-dsi.ing.unifi.it/~paolo/ps/tnn-94-gradient.pdf>>, IEEE Transactions on Neural Networks, vol. 5, Issue 2, Mar. 1994, pp. pp. 157-166.

Son, et al., "Measuring the Influence of Long Range Dependencies with Neural Network Language Models," retrieved at <<http://aclweb.org/anthology-new/W/W12/W12-2701.pdf>>, Proceedings of the NAACL-HLT 2012 Workshop: Will We Ever Really Replace the N-gram Model? On the Future of Language Modeling for HLT, Jun. 2012, pp. 1-10.

Kuhn, et al., "A Cache-Based Natural Language Model for Speech Recognition," retrieved at <<http://visgraph.cs.ust.hk/biometrics/Papers/Voice/pami1990-06-01.pdf>>, IEEE Transactions on Pattern Analysis and Machine Intelligence, vol. 12, Issue 6, Jun. 1990, pp. 570-583.

Bellegarda, Jerome R., "Exploiting Latent Semantic Information in Statistical Language Modeling," retrieved at <<http://www.cse.yorku.ca/course_archive/2007-08/W/6328/Reading/Belleg_LSA.pdf>>, Proceedings of the IEEE, vol. 88, Issue 8, Aug. 2000, pp. 1279-1296.

Coccaro, et al., "Towards Better Integration of Semantic Predictors in Statistical Language Modeling," retrieved at <<http://citeseerx.ist.psu.edu/viewdoc/download?doi=10.1.1.54.508&rep=rep1&type=pdf>>, Proceedings of ICSLP-98, Nov. 1998, 4 pages.

Kneser, et al., "On the Dynamic Adaptation of Stochastic Language Models," retrieved at <<http://www.steinbiss.de/vst93a.pdf>>, Proceedings of the IEEE International Conference on Acoustics, Speech, and Signal Processing, Apr. 1993, pp. 586-589.

Iyer, et al., "Modeling Long Distance Dependence in Language: Topic Mixtures Versus Dynamic Cache Models," retrieved at <<http://ieeexplore.ieee.org/stamp/stamp.jsp?tp=&arnumber=736328>>, IEEE Transactions on Speech and Audio Processing, vol. 7, Issue 1, Jan. 1999, pp. 30-39.

Zweig, et al., "Personalizing Model M for Voice-search," retrieved at <<http://research.microsoft.com/en-us/um/people/gzweig/Pubs/Interspeech2011.pdf>>, Proceedings of Interspeech 2011, Aug. 2011, 4 pages.

Chen, Stanley F., "Performance Prediction for Exponential Language Models," Proceedings of NAACL-HLT, Jun. 2009, pp. 450-458.

Chen, Stanley F., "Shrinking Exponential Language Models," retrieved at <<http://acl.eldoc.ub.rug.nl/mirror/N/N09/N09-1053.pdf>>, Proceedings of NAACL-HLT, Jun. 2009, pp. 468-476.

Lau, et al., "Trigger-Based Language Models: A Maximum Entropy Approach," retrieved at <<http://ieeexplore.ieee.org/stamp/stamp.jsp?arnumber=00319225>>, Proceedings of the IEEE International Conference on Acoustics, Speech, and Signal Processing, vol. 2, Apr. 27, 1993, pp. 45-48.

(56) References Cited

OTHER PUBLICATIONS

Rosenfeld, R., "A Whole Sentence Maximum Entropy Language Model," retrieved at <<http://citeseerx.ist.psu.edu/viewdoc/download?doi=10.1.1.40.4834&rep=rep1&type=pdf>>, Proceedings of the IEEE Workshop on Automatic Speech Recognition and Understanding, Dec. 1997, 8 pages.
Martens, et al., "Learning Recurrent Neural Networks with Hessian-Free Optimization," retrieved at <<http://www.icml-2011.org/papers/532_icmlpaper.pdf>>, Proceedings of the 28th International Conference on Machine Learning, Jun. 2011, 8 pages.
Hochreiter, et al., "Long Short-Term Memory," retrieved at <<http://web.eecs.utk.edu/~itamar/courses/ECE-692/Bobby_paper1.pdf>>, Journal of Neural Computation, No. 9, Nov. 1997, pp. 1735-1780.
Blei, et al., "Latent Dirichlet Allocation," retrieved at <<http://www.cs.princeton.edu/~blei/papers/BleiNgJordan2003.pdf>>, Journal of Machine Learning Research, vol. 3, Jan. 2003, pp. 993-1022.
Chu, et al., "Improving Arabic Broadcast Transcription Using Automatic Topic Clustering," retrieved at <<http://www.mirlab.org/conference_papers/International_Conference/ICASSP%202012/pdfs/0004449.pdf>>, Proceedings of the IEEE International Conference on Acoustics, Speech, and Signal Processing, Mar. 2012, pp. 4449-4452.
Mikolov, Tomas, "Statistical Language Models Based on Neural Networks," retrieved at <<http://www.fit.vutbr.cz/~imikolov/rnnlm/thesis.pdf>>, PhD Thesis, Brno University of Technology, Nov. 26, 2012, 133 pages.
Emami, et al., "Exact Training of a Neural Syntactic Language Model", retrieved at <<http://ispl.korea.ac.kr/conference/ICASSP2004/pdfs/0100245.pdf>>, Proceedings of IEEE International Conference on Acoustics, Speech, and Signal Processing, vol. 1, May 2004, pp. 245-248.
Marcus, et al., "Building a Large Annotated Corpus of English: The Penn Treebank," retrieved at <<http://acl.ldc.upenn.edu/J/J93/J93-2004.pdf>>, Journal of Computational Linguistics, vol. 19, No. 2, Jun. 1993, pp. 313-330.
Filimonov, et al., "A Joint Language Model with Fine-Grain Syntactic Tags," retrieved at http://140.116.245.248/ACL-IJCNLP-2009/EMNLP/pdf/EMNLP116.pdf>>, Proceedings of the Conference on Empirical Methods in Natural Language Processing, 2009, pp. 1114-1123.
Povey, et al., "The Kaldi Speech Recognition Toolkit," retrieved at <<http://publications.idiap.ch/downloads/papers/2012/Povey_ASRU2011_2011.pdf>>, Proceedings of the IEEE Workshop on Automatic Speech Recognition and Understanding, Dec. 2011, 4 pages.
Reichl, et al., "Robust Decision Tree State Tying for Continuous Speech Recognition," retrieved at <<http://www.cse.yorku.ca/course_archive/2007-08/W/6328/Reading/Reichl_tree.pdf>>, IEEE Transactions on Speech and Audio Processing, vol. 8, Issue 5, Sep. 2000, pp. 555-566.
Povey, et al., "The Subspace Gaussian Mixture Model—A Structured Model for Speech Recognition," retrieved at <<http://noel.feld.cvut.cz/gacr0811/publ/POV11.pdf>>, Journal of Computer Speech and Language, vol. 25, Issue 2, Apr. 2011, pp. 404-439.
Xu, et al., "Self-Supervised Discriminative Training of Statistical Language Models," retrieved at <<http://old-site.clsp.jhu.edu/~damianos/asru09.pdf>>, Proceedings of the IEEE Workshop on Automatic Speech Recognition and Understanding, Nov. 2009, 6 pages.
Chen, et al., "An Empirical Study of Smoothing Techniques for Language Modeling," retrieved at <<http://acm.org>>, Proceedings of the 34th Annual Meeting on Association for Computational Linguistics, 1996, pp. 310-318.
Mikolov, et al., "Context Dependent Recurrent Neural Network Language Model," retrieved at <<http://research.microsoft.com/pubs/172207/mn_ctxt_TR.pdf>>, Microsoft Research Technical Report MSR-TR-2012-92, Jul. 27, 2012, 10 pages.
Park, et al., "Improved Neural Network Based Language Modelling and Adaptation," retrieved at <<http://mi.eng.cam.ac.uk/~xl207/publications/conferences/IS2010-nnlm.pdf>>, Proceedings of Interspeech 2010, Sep. 2010, 4 pages.
Arisoy, et al., "Deep Neural Network Language Models," retrieved at <<http://acl.eldoc.ub.rug.nl/mirror/W/W12/W12-27.pdf#page=30>>, Proceedings of NAACL-HLT 2012, Jun. 2012, pp. 20-28.
Khudanpur, et al., "Maximum Entropy Techniques for Exploiting Syntactic, Semantic and Collocational Dependencies in Language Modeling," retrieved at <<http://citeseerx.ist.psu.edu/viewdoc/summary?doi=10.1.1.34.8552>>, Computer Speech and Language, vol. 14, No. 4, 2000, 22 pages.
Arisoy, et al, "Discriminative Language Modeling With Linguistic and Statistically Derived Features," retrieved at <<http://ieeexplore.ieee.org/xpls/abs_all.jsp?arnumber=5955079>>, IEEE Transactions on Audio, Speech, and Language Processing, vol. 20, Issue 2, Feb. 2012, pp. 540-550.
Zamora-Martinez, et al., "Cache Neural Network Language Models Based on Long-distance Dependencies for a Spoken Dialog System," retrieved at <<http://ieeexplore.ieee.org/stamp/stamp.jsp?arnumber=06289041>>, Proceedings of the IEEE International Conference on Acoustics, Speech, and Signal Processing, Mar. 2012, pp. 4993-4996.
Xu, et al., "Random Forests and the Data Sparseness Problem in Language Modeling," retrieved at <<http://www.sciencedirect.com/science/article/pii/S0885230806000040>>, Computer Speech and Language, vol. 21, Issue 1, Jan. 2007, pp. 105-152.
Deerwester, et al., "Indexing by Latent Semantic Analysis," retrieved at <<http://lsa.colorado.edu/papers/JASIS.lsi.90.pdf>>, Journal of the American Society for Information Science, vol. 41, No. 96, 1990, 34 pages.
Mirowski, "Feature-rich Continuous Language Models for Speech Recognition," retrieved at <<http://ieeexplore.ieee.org/stamp/stamp.jsp?tp=&arnumber=5700858>>, Proceedings of the IEEE Spoken Language Technology Workshop, Dec. 2010, pp. 241-246.

* cited by examiner

FEATURE-AUGMENTED NEURAL NETWORKS AND APPLICATIONS OF SAME

BACKGROUND

A language model determines a probability for a sequence of input items, such as a sequence of input words, letters, phonemes, etc. In some cases, the language model is agnostic with respect to the context in which it is applied at runtime. As such, users who input the same information into a language model in different contexts will receive the same output result. In other cases, language models have been built which attempt to take context into account at runtime, to varying extents. For example, a system may produce plural models for different topics based on different topic-centric training sets. The system then selects the most appropriate model at runtime for application to a particular instance of input information.

Known context-based language models have proven effective, yet there is room for improvement in this technological field.

SUMMARY

A system is described herein which uses a neural network having an input layer that accepts an input vector and a feature vector. The input vector represents at least part of input information, such as, but not limited to, a word in sequence of words. The feature vector provides supplemental information that pertains to the input information and complements the input information. The neural network produces an output vector based on the input vector and the feature vector. The neural network may be regarded as "feature-augmented" insofar as it produces output information conditioned on the use of the feature vector.

In one implementation, the neural network is a recurrent neural network. The recurrent neural network has a hidden layer that operates on: (a) the input vector, as modified by a first matrix; (b) the feature vector, as modified by a second matrix; and (c) a time-delayed hidden-state vector that represents an output from the hidden layer in a previous time instance. The output layer of the neural network operates on: (a) the output of the hidden layer, as modified by a fourth matrix; and (b) the feature vector, as modified by a fifth matrix.

According to one illustrative aspect, the system can generate the feature vector based on latent information that is extracted from the input information itself Alternatively, or in addition, the system can generate the feature vector based on information that is obtained from source(s) other than the input information. These kinds of sources are referred to as "external" herein.

According to another illustrative aspect, the system can use various techniques to generate the feature vector. For example, the system can use, without limitation, a Latent Dirichlet Allocation (LDA) technique, a Latent Semantic Analysis (LSA) technique, a Principal Component Analysis (PCA) technique, etc.

Also described herein are various applications of the system. Without limitation, the system can be used to disambiguate the results provided by a speech recognition system, reformulate a query, re-rank search results, translate source language information into target language information, perform spelling correction, etc.

The above functionality can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a system which uses a neural network to generate output information based on input information and supplemental information expressed as a feature vector. Section B describes illustrative functionality for generating the feature vector. Section C describes illustrative applications of the system of Section A. Section D describes illustrative computing functionality that can be used to implement any aspect of the features described in Sections A, B, and C.

Figure 18:
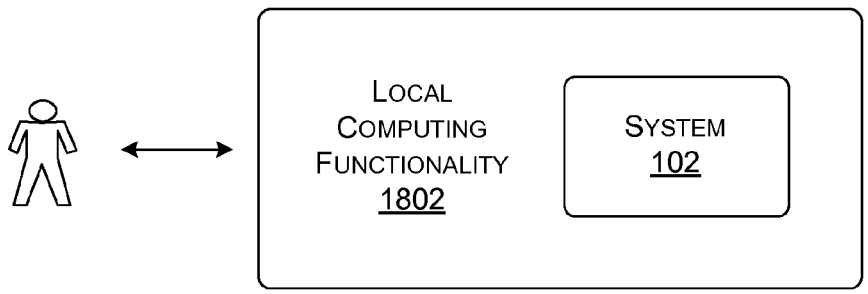
FIG. 18 shows a stand-alone local implementation of the system of FIG. 1.
Figure 19:
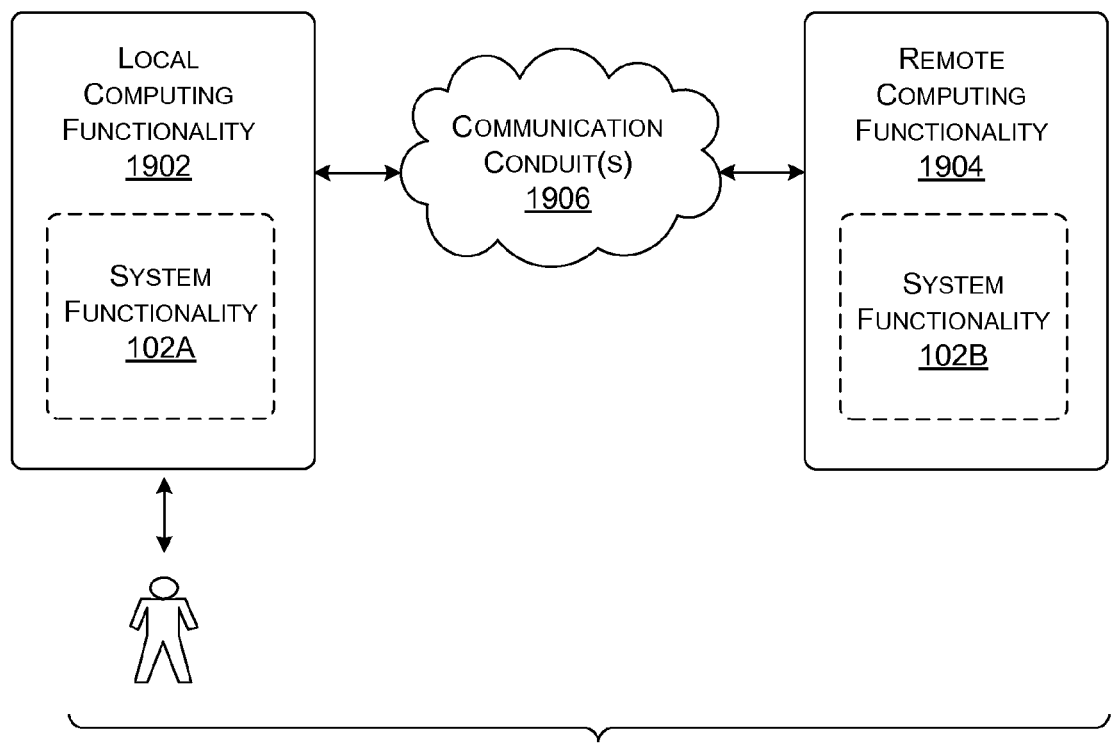
FIG. 19 shows a distributed implementation of the system of FIG. 1.
Figure 20:
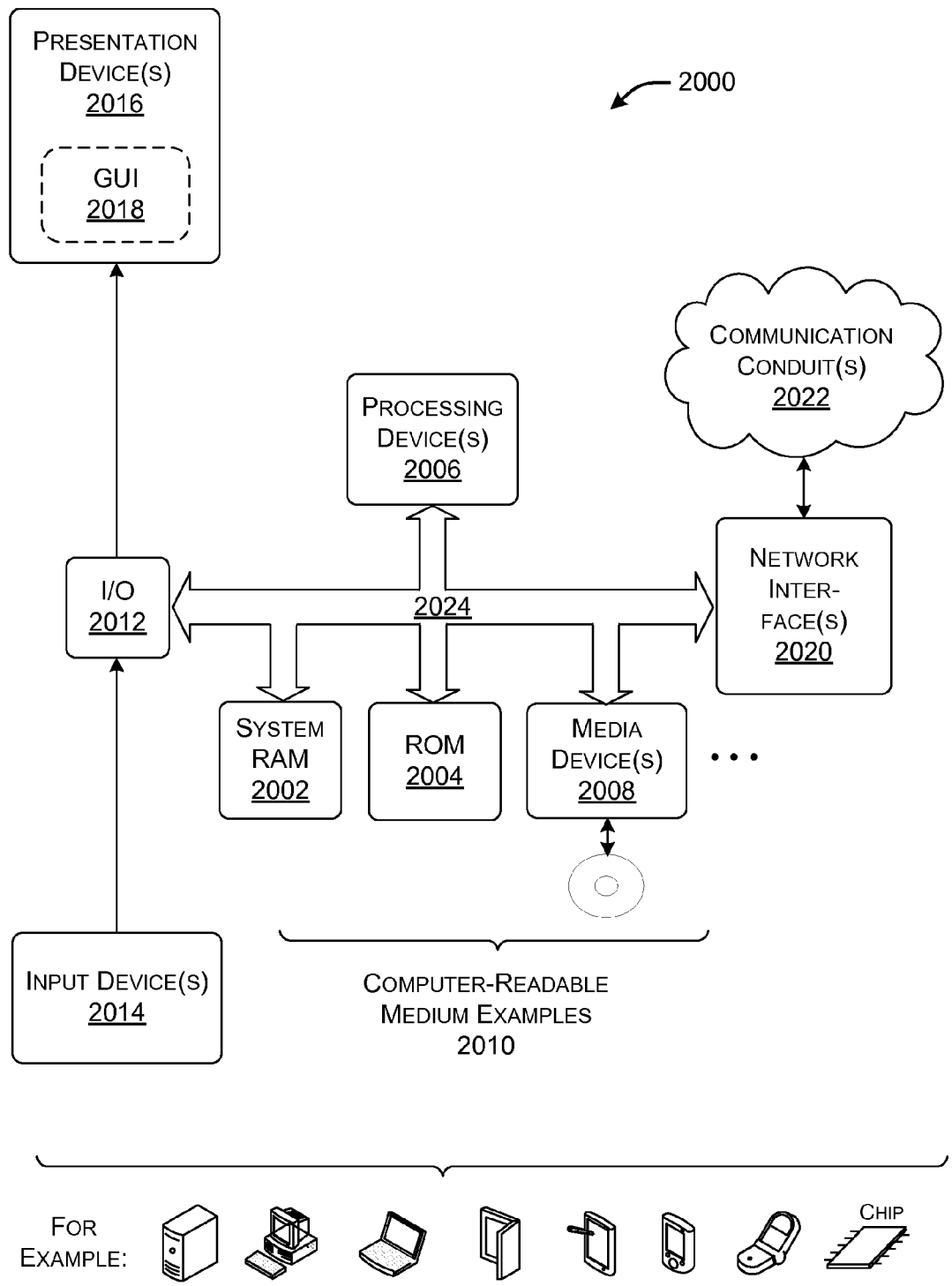
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIGS. 18-20, to be described in turn, provide additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
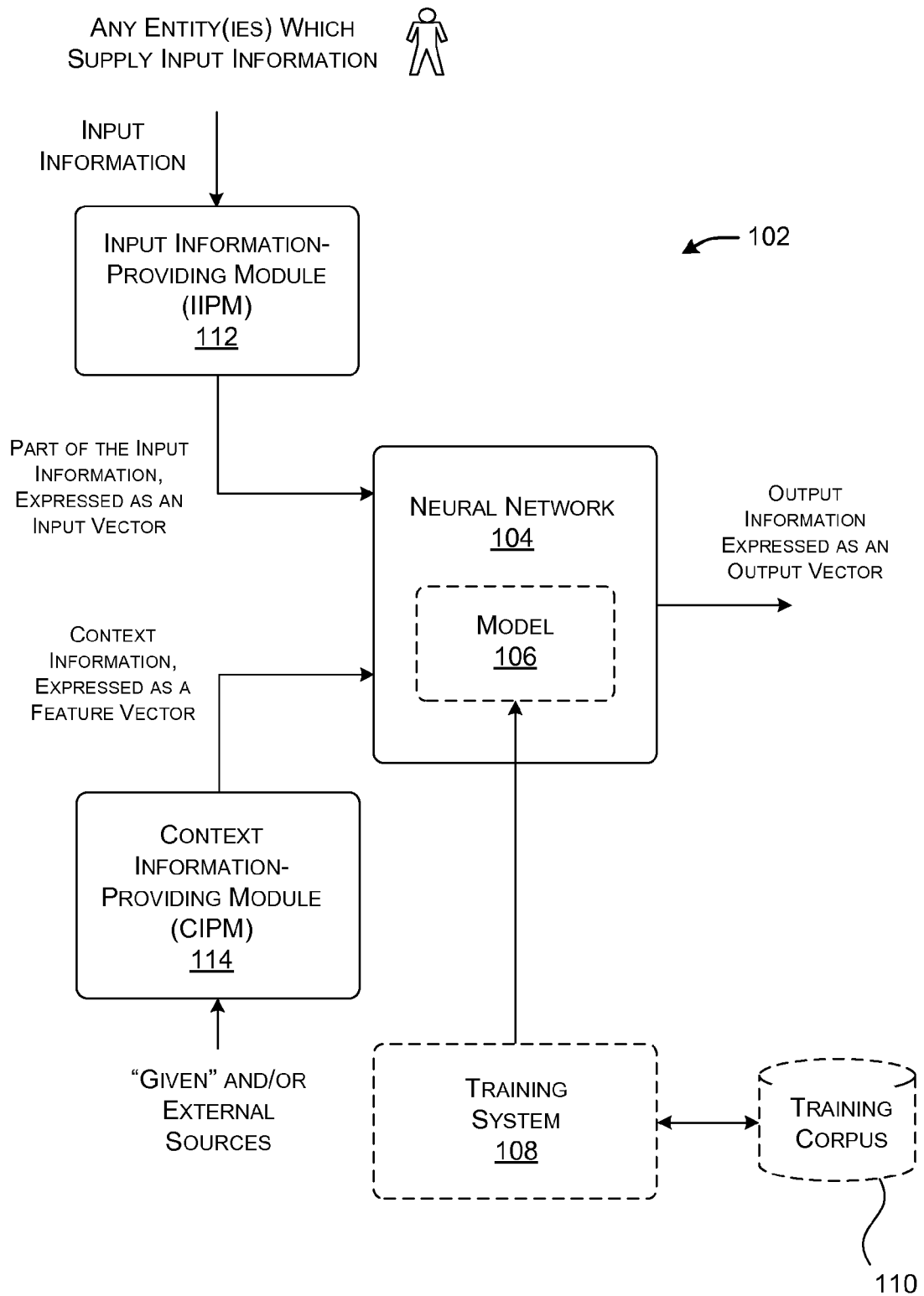
FIG. 1 shows an illustrative system that uses a neural network to generate output information based on input information and supplemental information.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview FIG. 1 shows an illustrative system 102 which maps input information into output information, conditioned on supplemental information. In one example, the supplemental information constitutes context information that describes a context pertaining to the input information, thereby complementing the input information. The context of the input information describes any circumstance or setting in which the input information occurs, or any information that is related to the input information. In one case, the system 102 can extract the context information from characteristics that are derivable from the input information itself. Alternatively, or in addition, the system 102 can obtain the context information from one or more external sources (that is, from sources that are other than the input information itself).

The system 102 uses a neural network 104 to map the input information and the context information into the output information. The neural network 104 can be implemented in any manner. In one case, the neural network 104 represents a recurrent neural network. A recurrent neural network includes a hidden layer of neurons that have recurrent connections to their own previous values. In another case, the neural network 104 can be implemented as any type of feed-forward neural network. More generally, the neural network 104 can include any number of neurons; that number may be selected based on any environment-specific considerations.

The neural network 104 operates on the basis of a model 106. The model 106 may correspond to a set of weighting matrices that are applied to various vectors in the neural network 104 (to be described in greater detail below). A training system 108 produces the model 106 based on a corpus of training examples in a data store 110. The training system 108 can produce the model 106 using any technique, such as a standard back projection technique. Each training example constitutes an established case in which an instance of input information, together with an instance of context information, maps into a particular instance of output information.

An input information-providing module (IIPM) 112 represents any functionality for receiving and processing the input information. For example, the IIPM 112 may process the input information by selecting a most recent word (or words) in a sequence of words being input by a user or some other entity. In one case, the IIPM 112 can express the selected input information as an input vector. For example, in one implementation, a defined vocabulary has B words.

The IIPM 112 can encode an input word as a B-dimensional vector, setting the dimension associated with the word to 1, and all other dimensions to 0. The vector may have a particular dimension dedicated to any word in the input information that is unrecognizable, with respect to the defined vocabulary.

A context information-providing module (CIPM) 114 represents any functionality for producing the context information. For example, without limitation, the CIPM 114 can use any of a Latent Dirichlet Allocation (LDA) technique, a Latent Semantic Analysis (LSA) technique, a Principle Component Analysis (PCA) technique, etc. to produce the context information. In one case, the CIPM 114 expresses the context information as a feature vector. As a whole, the neural network 104 may be regarded as a feature-augmented neural network because it uses the feature vector, in part, to produce the output information.

More specifically, in some cases, the CIPM 114 can produce a feature vector by drawing values from a continuous-space feature space or a non-continuous-space feature space. In a continuous-space representation, similar values in the feature space represent similar instances of the phenomena that are being modeled. In a non-continuous-space representation, arbitrary values may be assigned to the phenomena that are being modeled. For example, assume that different feature vectors represent different physical locations. In a continuous-space representation, two locations that are physically close together will correspond to similar "locations" in feature space. A feature space can achieve this result, for example, by using longitude and latitude information to formulate its values. In a non-continuous-space representation, two locations that are physically close together may be assigned arbitrary codes that cannot be said to be close to each other in a feature space.

Figure 2:
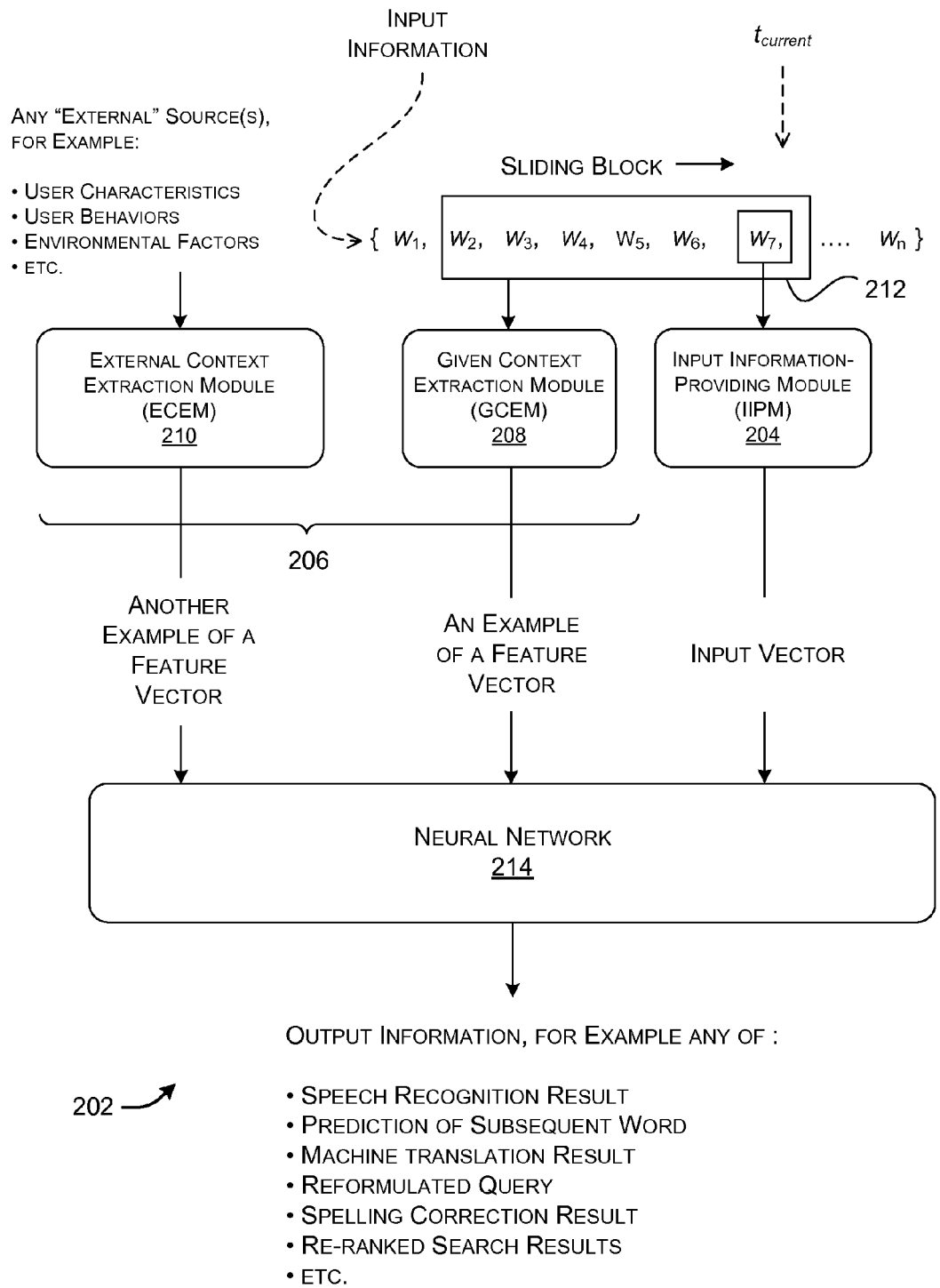
FIG. 2 shows one instantiation of the system of FIG. 1.

FIG. 2 shows a system 202 which is a more specific non-limiting instantiation of the system 102 of FIG. 1. In this scenario, an input information-providing module (IIPM) 204 receives a sequence of words that are input by a user or some other entity, e.g., one after the other, or all at the same time. For example, the IIPM 204 may receive a stream of words that are spoken by a user. That stream of words constitutes input information. The IIPM 204 may form an input vector that represents one or more input words in this sequence based on any application-specific considerations. In this non-limiting example, assume that the input vector represents the word $w_7$. In one application, the word $w_7$ may represent the most recent word that has been received at a current time t.

A context information-providing module (CIPM) 206 may extract context information from various sources, to produce the feature vector. The CIPM 206, in turn, may include a given context extraction module (GCEM) 208 and an external context extraction module (ECEM) 210.

The GCEM 208 can formulate a feature vector based on the words in the input information. It is characterized as a "given" extraction module insofar as the input information is given, and not obtained from a separate source. For example, the GCEM 208 may analyze a sliding block 212 of words in an input sequence of words. The block 212 of words may be regarded in aggregate as an input document. In the simplified case of FIG. 2, the sliding block 212 includes words $w_2$-$w_7$. Here, the block 212 includes the word $w_7$ that is used to encode the input vector; but in other implementations, the block 212 can include just the words which precede the word $w_7$, excluding the word $w_7$. Further, in other implementations, the block 212 may include many more words than six, such as 50 words in one implementation.

Instead of use a sliding window of words having a fixed length, the GCEM 208 can define a block to correspond to all the preceding words in a sentence that is being input, or all the preceding words in a paragraph that is being input, etc. In addition, or alternatively, the GCEM 208 can extract and analyze words which follow a specified current word in a sentence. In the context of FIG. 2, this implementation would expand the block 212 to encompass words which follow the word $w_7$ in the sequence, if available. In some applications, these subsequent words may be interpreted as "future" words insofar as they are words that are not yet the primary focus of analysis of the system 202.

After forming the block 212, the GCEM 208 can use any analysis technique to identify properties of the words in the block 212, such as an LDA technique, an LSA technique, etc. For example, these techniques can be used to identify topics in the block 212 of words. The GCEM 208 can then formulate a continuous-space feature vector which expresses the topics. In other cases, the GCEM 208 can identify other properties of the words in the block 212, such as syntactical information, morphological information, etc. For example, the GCEM 208 can use a parser to identify part-of-speech tags associated with the input words.

By contrast, ECEM 210 formulates a feature vector based on one or more external sources of information. The sources of information are characterized as external because they do not correspond to the input information itself.

In one case, the ECEM 210 can obtain context information that describes any characteristic(s) associated with a user who is submitting the input information, or who is otherwise associated with the input information. For example, the ECEM 210 can receive context information which expresses the identity, age, occupation, gender, interests, etc. of the user. In another case, the ECEM 210 can obtain context information that describes one or more characteristics associated with a population of users who are associated with the input information.

Alternatively, or in addition, the ECEM 210 can obtain the context information based on any behavior exhibited by the user (or a population of users to which the user belongs). For example, the ECEM 210 can receive context information that represents the user's previous requests, previous purchases, previous browsing selections, previous queries, and so on. Alternatively, or in addition, the ECEM 210 can receive context information that describes any task that the user is currently performing in the context of any service or application, such as a game that the user is currently playing.

Alternatively, or in addition, the ECEM 210 can obtain context information that describes aspects of an environment in which the user has submitted the input information, or in which the input information is otherwise obtained from any entity. For example, the ECEM 210 can extract temporal information corresponding to the time and/or date at which the user has entered the input information. Alternatively, or in addition, the ECEM 210 can obtain location information that describes a physical location at which the user has entered the input location, or a history of locations at which the user has submitted the last n instances of input information. Alternatively, or in addition, the ECEM 210 can obtain information which describes events that have occurred close to the time at which the user has submitted the input information. Alternatively, or in addition, the ECEM 210 can obtain information regarding media content that accompanies the presentation of the input information, and so on.

In some cases, the ECEM 210 can obtain the above-described types of external information from data sources that are "local" with respect to the system 202. For example, the system 202 can store and maintain a history (not shown) of the last n requests that a user has made in a voice retrieval system; the ECEM 210 can glean context information from this history. Alternatively, or in addition, the ECEM 210 can obtain the above-described external information from one or more other applications or services, such as social network applications, calendar systems, communication systems (such as instant messaging systems, Email systems, etc.), shopping systems, etc. For example, the ECEM 210 can extract friend information from a social networking site, contact list information from a calendar or Email application, and so on. As will be set forth below in Section D, the system 202 can adopt various provisions to ensure that any such data collection is duly authorized by the affected users, and that the information that is collected is maintained with appropriate levels of security.

The above-described types of "given" and "external" data sources are cited by way of illustration, not limitation. Other implementations can form the feature vector by gleaning information from other sources. Further, the CIPM 114 need not draw exclusively from either the GCEM 208 or the ECEM 210 in constructing a feature vector; that is, the CIPM 114 can also formulate a feature vector based on information extracted from both "given" and external data sources.

A neural network 214 of any type accepts the input vector and the feature vector, and, in response, generates an output vector. The output information can be interpreted in different ways for different respective applications of the system 202, where each application employs an appropriately trained model. Section C sets forth several illustrative applications.

By way of overview, in one case, the output information may predict a word or words that are expected to follow a current word, e.g., by predicting the identity of the most likely word $w_8$ that is expected to follow the word $w_7$ in the example of FIG. 2. For example, a voice search application can use this approach to help disambiguate a spoken word or phrase, given previously interpreted content in the user's utterance.

In another case, the output information may represent a reformulation of the word (or words) that are expressed by the input information. For example, the input information may represent a query or part of a query. The output information may represent a reformulation of at least part of that query. Or the input information may represent an incorrectly spelled word. The corresponding output information for this case may represent a correctly-spelled version of the input word.

In another case, the output information may represent concepts that have any kind of semantic relation to concepts associated with the input information. This mapping of concepts may also be designed to reflect any environment-specific objectives. For example, the input information may represent original keywords that may or may not be effective in triggering the presentation of related content, such as ads. The output information may represent a reformulation of the original keywords such that the revised keywords are more likely to trigger the presentation of related content, compared to the original keywords.

In another case, the output information may represent a translation of the word (or words) that are expressed by the input information. For example, the input information may represent an input phrase in a source language. The output information may represent a phrase in a target language that is a translation of the source language input phrase. Or the output information may represent a phrase in the source language that is a paraphrased (e.g., a canonical) version of the source language input sentence.

Still other interpretations of the output information are possible. More generally, the neural network 214 can be adapted to a particular application by preparing a training corpus of examples that map desired kinds of inputs to desired kinds of outputs, given the presence of specified kinds of contextual factors. The training system 108 (of FIG. 1) can then generate a model based on this training corpus. At runtime, the system 202 feeds the appropriate types of input information and context information to the neural network 214, to yield the desired kind of output information.

The above-described examples assume that the input vector represents one or more words, and the output vector represents probabilities associated with one or more words. But more generally, each of the vectors may represent one or more items having any correlation with real-world entities. For example, in other cases, the vectors may represent letters, part-of-speech information, phonemes, etc.

Figure 3:
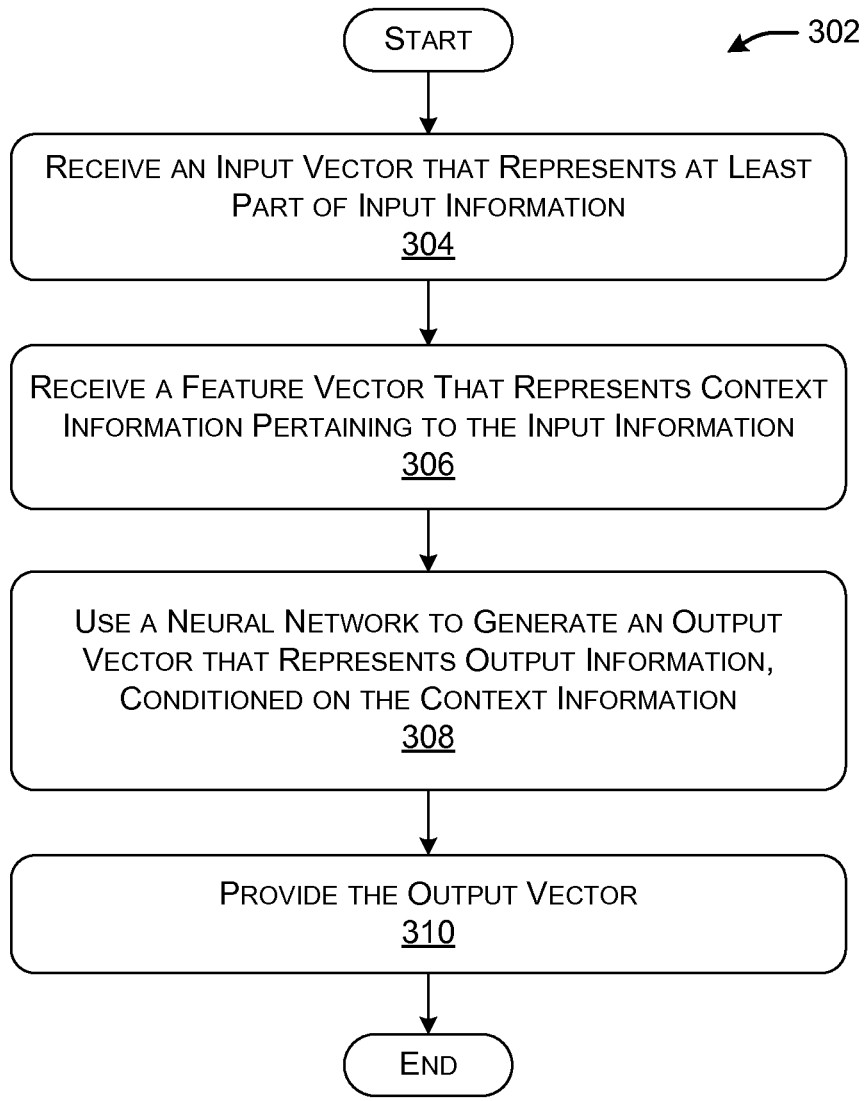
FIG. 3 shows a procedure that represents one manner of operation of the system of FIG. 1.

FIG. 3 shows a procedure 302 that summarizes one manner of operation of the system 102 of FIG. 1 (and also the system 202 of FIG. 2). In block 304, the neural network 104 receives an input vector that represents at least part of input information. In block 306, the neural network 104 receives a feature vector that represents context information obtained from any given and/or external sources. As described above, a given source corresponds to the input information itself, while an external source corresponds to some source other than the input information. In block 308, the neural network 104 generates an output vector based on the input vector and the feature vector. The output vector expresses output information. In block 310, the neural network 104 provides the output vector.

Figure 4:
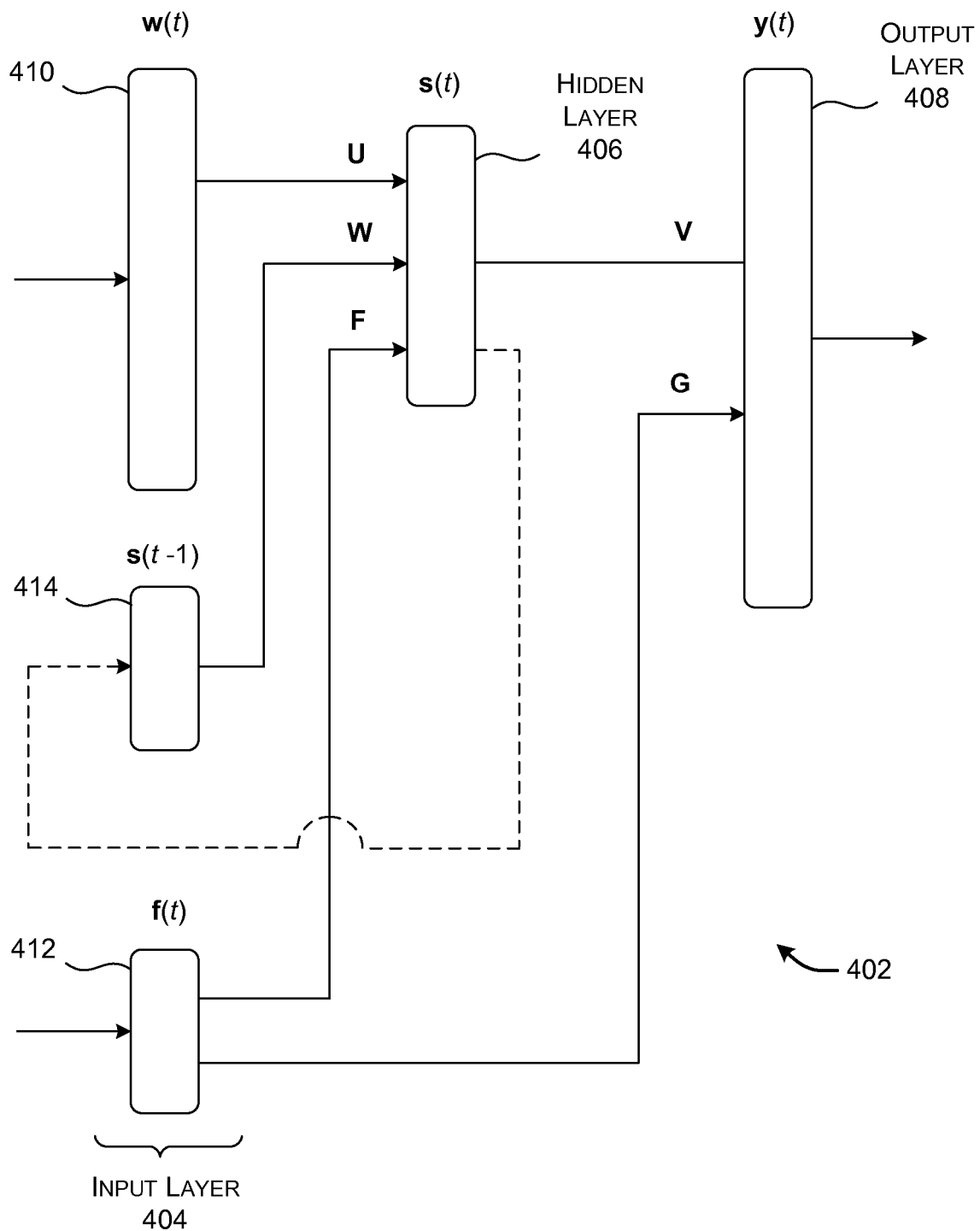
FIG. 4 shows a particular implementation of the neural network of FIG. 1; here, the neural network corresponds to a recurrent neural network.

FIG. 4 shows a recurrent neural network 402 that represents one non-limiting implementation of the neural network 104 of FIG. 1 or the neural network 214 of FIG. 2. The neural network 402 includes an input layer 404, a hidden layer 406, and an output layer 408.

The input layer 404 includes a component 410 for receiving an input vector, here represented by w(t). The input layer 404 also includes a component 412 for receiving a feature vector, here represented by f(t). The input layer 404 also includes a component 414 that captures an output of the hidden layer 406 from a previous instance of time, t−1; that is, the component 414 captures time-delayed output values of the hidden layer 406, expressed as s(t−1).

The hidden layer 406 generates its output s(t) based on the input vector w(t) as modified by a first matrix U, the feature vector f(t) as modified by a second input matrix F, and the time-delayed output s(t−1) as modified by a third matrix W. The output layer 408 generates its output vector y(t) based on the output s(t) of the hidden layer 406 as modified by a fourth matrix V, and based on the feature vector f(t) as modified by a fifth matrix G.

The neural network 402 is said to be recurrent due to the presence of the loop shown in dotted lines, e.g., in which the time-delayed output of the hidden layer 406 feeds back into the input layer 404. After a series of time intervals, the output of the hidden layer 406 also captures the "residue" of inputs supplied over a plurality of previous instances of time, including a plurality of instances of the output vector (t−1). This means that the neural network 402 is capable of capturing long span dependencies in the input information, compared to, for example, a feed-forward neural network.

The training system 108 of FIG. 1 may train the neural network 402 of FIG. 4 using stochastic gradient descent and back-propagation of errors, based on the training examples in the training corpus. Each example constitutes a case in which a particular input vector w(t) and a particular feature vector f(t) are mapped to a particular output vector y(t). The use of the feature vectors in the training operation helps eliminate or reduce difficulties that might otherwise arise in modeling long span dependencies in a recurrent neural network (commonly referred to as the vanishing gradient problem). This is because each feature vector may itself capture aspects of a long span dependency. The model 106 produced by the training system 108 may correspond to a particular instantiation of the matrices U, F, W, V, and G described above.

Different implementations of the neural network 402 can rely on different equations to map the input information to the output information. In one non-limiting case, the output s(t) of the hidden layer 406 can be expressed as:

$$s(t)=f(Uw(t)+Ws(t-1)+Ff(t)).$$

The output vector y(t) provided by the output layer 408 can be expressed as:

$$y(t)=g(Vs(t)+Gf(t)).$$

The above functions $f$ and g may be expressed, with respect to a placeholder variable z, by:

$$f(z) = \frac{1}{1+e^{-z}}, \text{ and } g(z_m) = \frac{e^{z_m}}{\sum_k e^{z_k}}.$$

The denominator in the function for g has the effect of normalizing the output vector y(t) such that it components sum to 1, thus forming a probability distribution.

B. Illustrative Techniques for Generating Feature Vectors

This Section sets forth two implementations of the context information-providing module (CIPM) 114 of FIG. 1, and, more specifically, the given context extraction module (GCEM) 208 of FIG. 2. The first implementation uses the Latent Dirichlet Allocation (LDA) technique to generate a feature vector. The second implementation uses the Latent Semantic Analysis (LSA) to generate a feature vector. Other implementations can use other analysis technique besides LDA and/or LSA, or in addition to LDA and/or LSA. Further, it will be assumed in this Section that the CIPM 114 applies LDA and/or LSA to a block of words in the input information, which may be conceptualized as a document. However, other implementations can perform analysis on items other than words in the input information. Further, it will be assumed in this Section that the LDA and LSA techniques identify topics associated with the input documents. However, the LDA and LSA techniques can be used to identify other latent aspects of the input documents, depending on the interpretation of the items which compose the documents.

Figure 5:
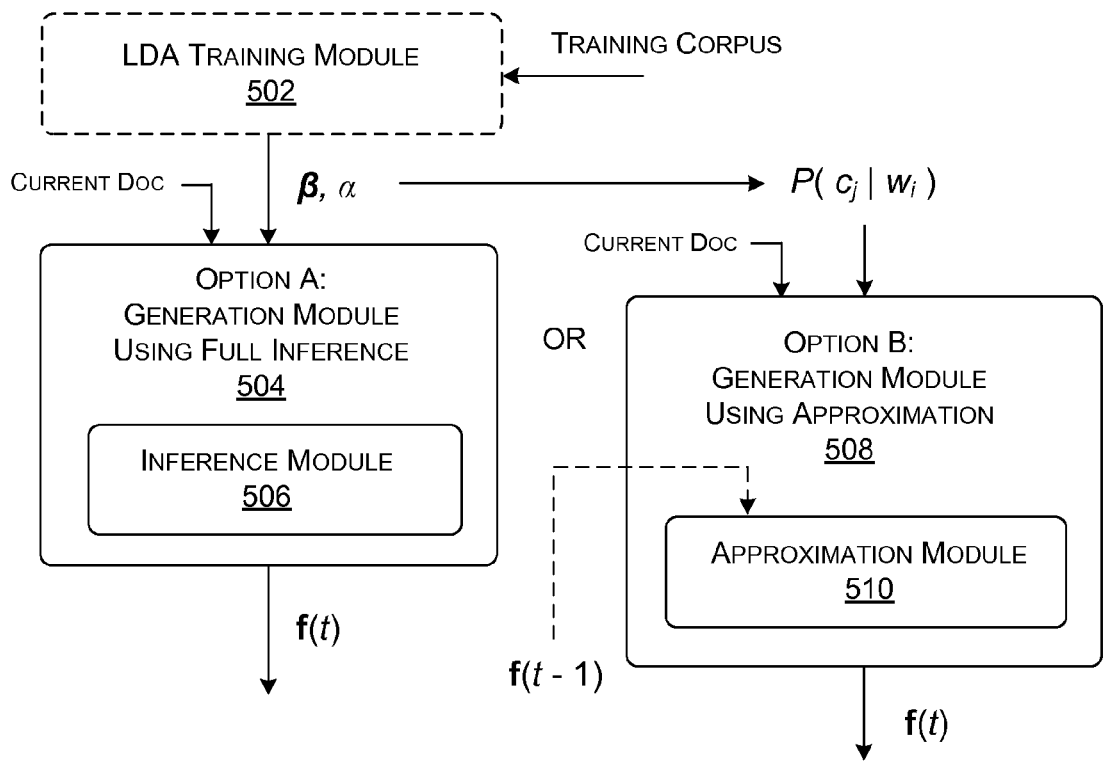
FIG. 5 shows functionality for producing a feature vector using a Latent Dirichlet Allocation (LDA) technique.

FIG. 5 describes one implementation of the CIPM 114 using LDA. In general, LDA corresponds to a generative technique in which each document in a corpus of training documents is considered, for modeling purposes, to have been generated by the following procedure.

(1) The length N of the document is identified, e.g., by sampling from a Poisson distribution.

(2) A multinomial distribution over topics is decided for the document by sampling from a Dirichlet distribution parameterized by the parameter a. In other words, this step identifies the topics that are associated with the document, together with a probability associated with each topic. For example, this step may determine that a document contains topic A, with a probability of $p_1$, topic B with a probability of $p_2$, and topic C with a probability of $p_3$. In one implementation, the parameter a may be considered as fixed across topics.

(3) Each word is chosen for the document by first selecting one of the topics associated with the document. Each topic is associated with a unigram distribution of words associated with the topic, with a probability associated with each word. The selection of the word involves then choosing one of the words from the distribution of the words associated with the selected topic.

An LDA training module 502 analyzes a corpus of documents based on the premise that the documents have been generated using the procedure described above (although the documents are not actually produced in this manner). Based on its analysis, the LDA training module 502 produces a matrix β that estimates the unigram topic distributions associated with the documents in the corpus, together with the parameter α. More specifically, the matrix β identifies a plurality of topics. For each topic, the matrix β identifies a distribution of words that are associated with the topic. For example, assume that one of the topics corresponds to "football." The topic distribution for this subject may identify the terms "quarterback," "first down," "field goals," etc. with respective probabilities associated with these terms. The LDA training module 502 can use any technique to generate this model, such as a variational expectation maximization (EM) technique, a Gibbs sampling technique, etc.

A generation module 504 represents a first implementation of the CIPM 114. The generation module 504 receives a current document. In one case, the current document corresponds to a sliding window of words in a sequence of words (e.g., in FIG. 2, the block 212 of words $w_2$-$w_7$). The generation module 504 also receives the matrix β and the parameter a from the LDA training module 502. The generation module 504 then uses a full inference module 506 to generate a distribution of topics associated with the document, based on β and α. The full inference module 506 can use any technique for performing inference, such as a variational inference technique. The generation module 504 can then formulate the discovered topics as a feature vector f(t).

Alternatively, a generation module 508 may use an approximation module 510 to generate the feature vector f(t), without using full inference. The system 102 of FIG. 1 may opt to use an approximation technique so as to compute f(t) in less time and/or using fewer resources compared to the case of full inference performed by the generation module 504. This is because the full inference procedure may represent a potentially time-intensive and resource-intensive (e.g., memory-intensive) operation.

In one implementation, the approximation technique operates by first using Bayes rule to reformulate the matrix β to express, for each given word $w_i$ in the vocabulary, a distribution of topics associated with that word, instead of unigram distribution of words associated with respective topics. A distribution of a topics for a particular word $w_i$ may be expressed as P ($c_j|w_i$), where identifies $c_j$ identifies a particular topic in the distribution. The feature vector f(t) can then be approximated according to the following equation:

$$f(t) = \frac{1}{Z} \prod_{i=1}^{K} c_{w_i}(t).$$

In this equation, K identifies a number of words $w_i$ at a time t that are present in the current document, such as the words $w_2$-$w_7$ shown in FIG. 2 that appear in the sliding block 212 at a current time t. Each $c_{w_i}$ corresponds to a distribution of topics associated with a word $w_i$ in the document. Considered as a whole, the above equation forms a product, dimension-by-dimension, of the distributions associated with the words in the document, such as the words $w_2$, $w_3$, $w_4$, $w_5$, $w_6$, and $w_7$ in the block 212. The equation then normalizes the components of the resultant product by an appropriate factor Z, to ensure that the components sum to 1.

In addition, the generation module 508 can optionally compute a next feature vector in an incremental fashion based on the previous feature vector, together with a decay factor $\gamma$. On manner of performing this incremental update is expressed as:

$$f(t) = \frac{1}{Z} f(t-1)^{\gamma} c_{w_{newly\ added}}^{(1-\gamma)}.$$

In this equation, the "newly added" distribution $c_w$ corresponds to the distribution of topics for the word that is added to the document at a new time t, compared to time t−1. For example, in FIG. 2, assume that, at a next instance, the block 212 of words slides to the right, such that that the block 212 now includes words $w_3$-$w_8$. In this case, the $c_w$ vector in the above equation expresses the topic distribution for the newly added word $w_8$. Overall, the incremental update equation has the effect of exponentially decreasing the contribution of past feature information for increasingly remote prior instances of time, as controlled by the decay factor $\gamma$. The factor Z normalizes the feature vector so that its components sum to 1.

Figure 6:
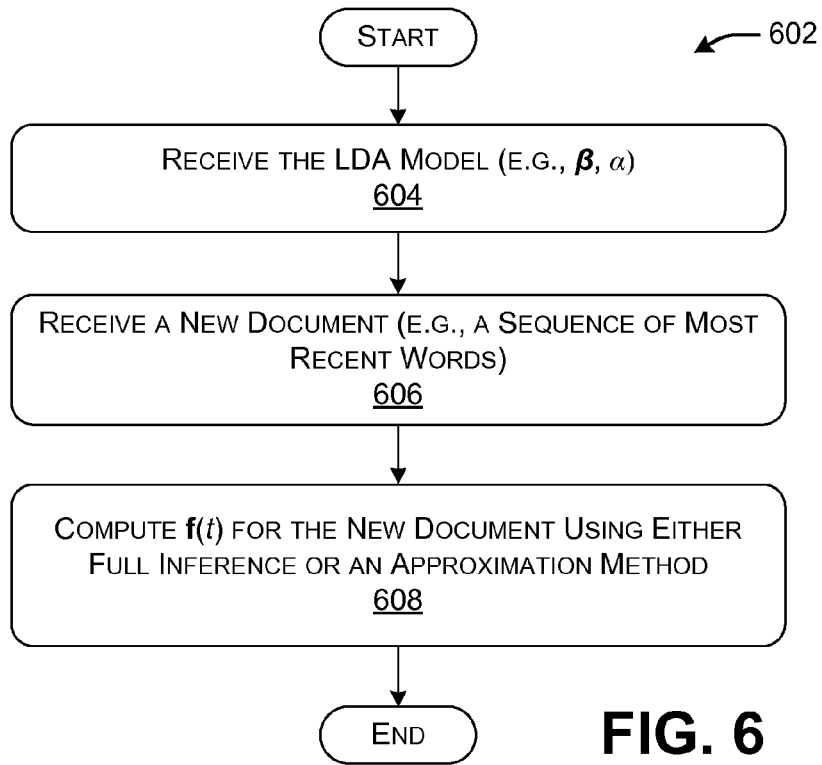
FIG. 6 shows a procedure that represents one manner of operation of the functionality of FIG. 5.

FIG. 6 is a procedure 602 which summarizes the operation of the functionality shown in FIG. 5. In block 604, the CIPM 114 receives an LDA model, characterized by the β matrix and the α parameter. In block 606, the CIPM 114 receives a new document to analyze using the LDA technique. In the running example presented herein, the document corresponds to the block 212 of words $w_2$-$w_7$ shown in FIG. 2. In block 608, the CIPM 114 computes a feature vector f(t) associated with the new document, which expresses a distribution of topics associated with the new document. If the inference module 506 is used (for option A), then the CIPM 114 uses full inference to compute f(t). Alternatively, if the approximation module 510 is used (for option B), then the CIPM 114 directly computes f(t) using the columns of the matrix β, with or without the use of incremental updating.

Figure 7:
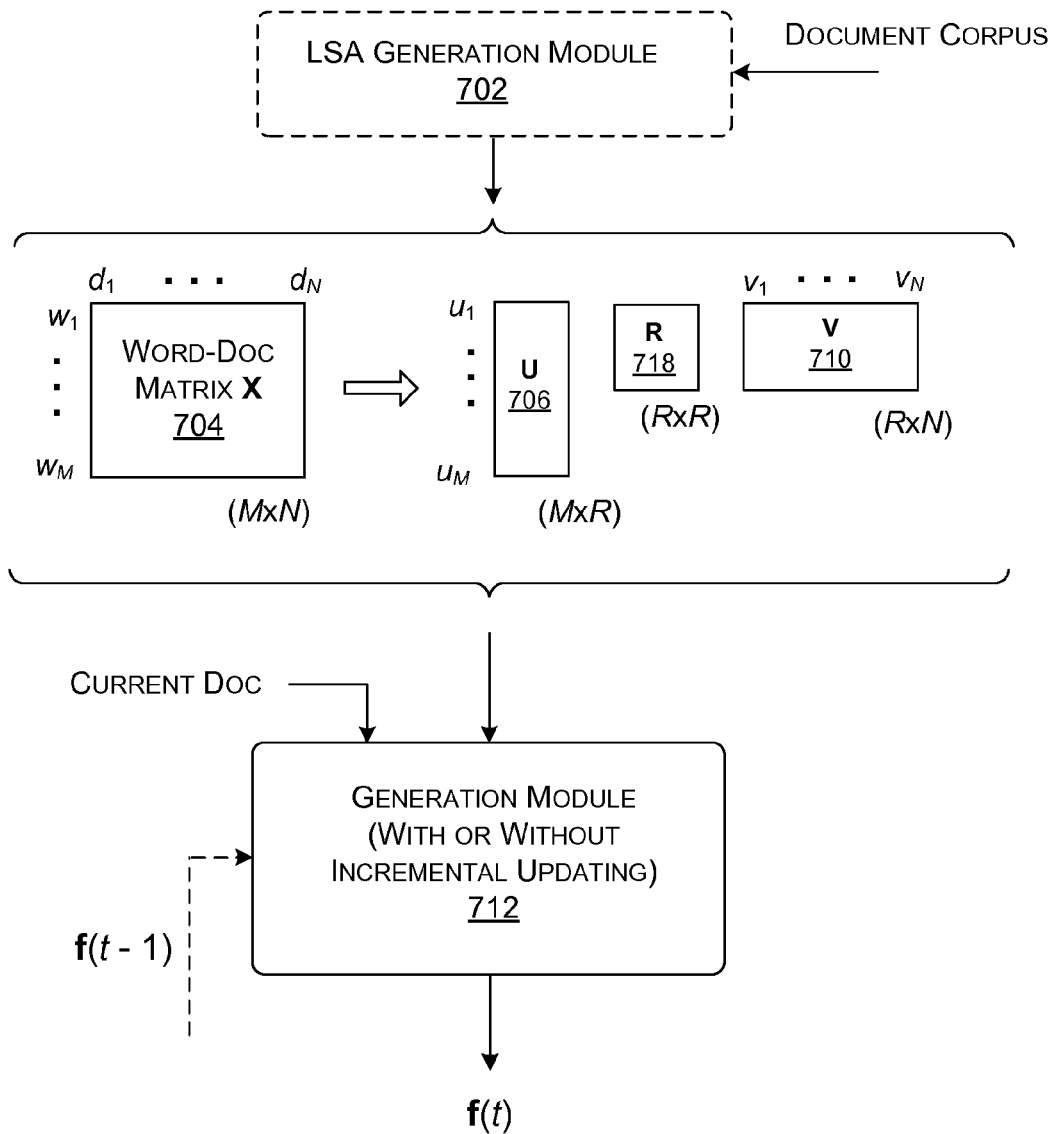
FIG. 7 shows functionality for producing a feature vector using a Latent Semantic Analysis (LSA) technique.

Advancing to FIG. 7, this figure shows functionality for implementing the CIPM 114 using the LSA technique. In this approach, an LSA generation module 702 first generates a word-document matrix X 704 based on a corpus of N documents, $d_1$-$d_N$. The documents collectively include a vocabulary that includes M words, $w_1$-$w_M$. More specifically, the word-document matrix X 704 includes a collection of columns corresponding to the documents in the corpus, and a collection of rows corresponding to words found in the documents. Each element in the word-document matrix X 704 identifies a number of instances of a particular word in a particular document.

The LSA generation module 702 then decomposes the word-document matrix X 704 using singular value decomposition (SVD) into a lower-dimensional space expressed by three matrices, an orthogonal matrix U 706, a diagonal matrix R 708, and an orthogonal matrix V 710, such that $X=URV^T$. The matrix U 706 is associated with word-related entries $u_1$-$u_M$, while the matrix V 710 is associated with document-related entries $v_1$-$v_N$. That is, each row in the matrix U 706 is associated with a word entry, while each column in the matrix V 710 is associated with a document entry. Collectively, the matrix U 706 and the matrix V 710 represent a semantic space; linguistic items (e.g., words, documents, etc.) that represent similar concepts are close together within that space, as assessed using a cosine similarity measure.

In an execution phase, a generation module 712 then computes a feature vector f(t) for each new document that is encountered, using the matrices described above. For example, again assume that a particular document for analysis is composed of the words $w_2$-$w_7$ shown in FIG. 2. The generation module 712 begins by forming a new column vector in the word-document matrix X 704, with entries that indicate counts for words $w_2$-$w_7$. The generation module 712 then computes a new entry for the matrix V 710, such that the relationship described above ($X=URV^T$) continues to be satisfied, where U and R remain unchanged. That new vector added to the matrix V 710 constitutes the feature vector f(t) for the new document.

Optionally, the generation module 712 can compute a feature vector in an incremental manner based on the previously-computed feature vector at time t−1, together with a decay factor $\gamma$. One equation that can be used to compute f(t) in this manner is:

$$f(t) = \gamma f(t-1) + (1-\gamma) L_{w_{newly\ added}}.$$

In this equation, the newly added $L_w$ represents a new word that is added at time t to the semantic space produced by the LSA technique. More specifically, the newly added $L_w$ corresponds to the row in the matrix U 706 that corresponds to the new word, where the matrix U 706 is the original matrix produced by the LSA generation module 702.

Figure 8:
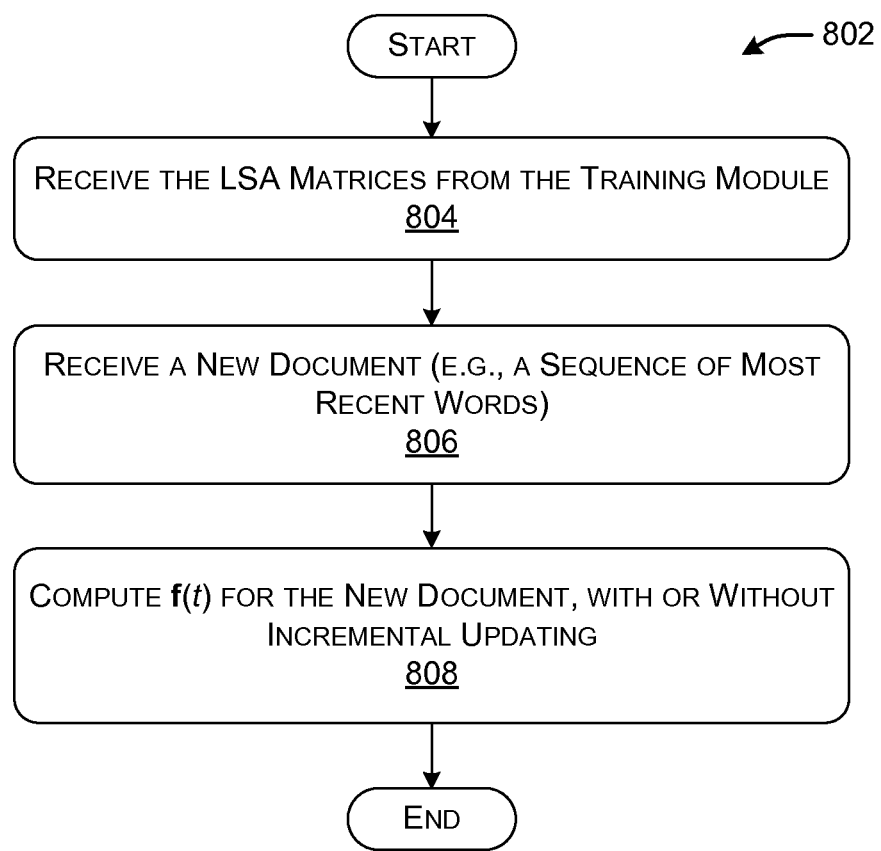
FIG. 8 shows a procedure that represents one manner of operation of the functionality of FIG. 7.

FIG. 8 is a procedure 802 that summarizes one manner of operation of the functionality shown in FIG. 7. In block 804, the CIPM 114 receives the above-described LSA matrices, e.g., X, U, R, and V. In block 806, the CIPM 114 receives a new document. In the running example set forth herein, the new document corresponds to the block of words $w_2$-$w_7$ shown in FIG. 2. In block 808, the CIPM 114 computes f(t) for the new document using the above-described technique, with or without the use of incremental updating.

To repeat, the CIPM 114 can be implemented using other techniques besides LDA and LSA. For example, in another case, the CIPM 114 can be implemented using Principal Component Analysis (PCA). PCA corresponds to a known technique for identifying aspects of a data set which most prominently contribute to variation in the data set.

C. Illustrative Applications

This Section sets forth illustrative applications of the system 102 of FIG. 1. This collection of applications is not exhaustive; that is, other applications can be provided which leverage the use of the system 102, although not expressly set forth herein.

Figure 9:
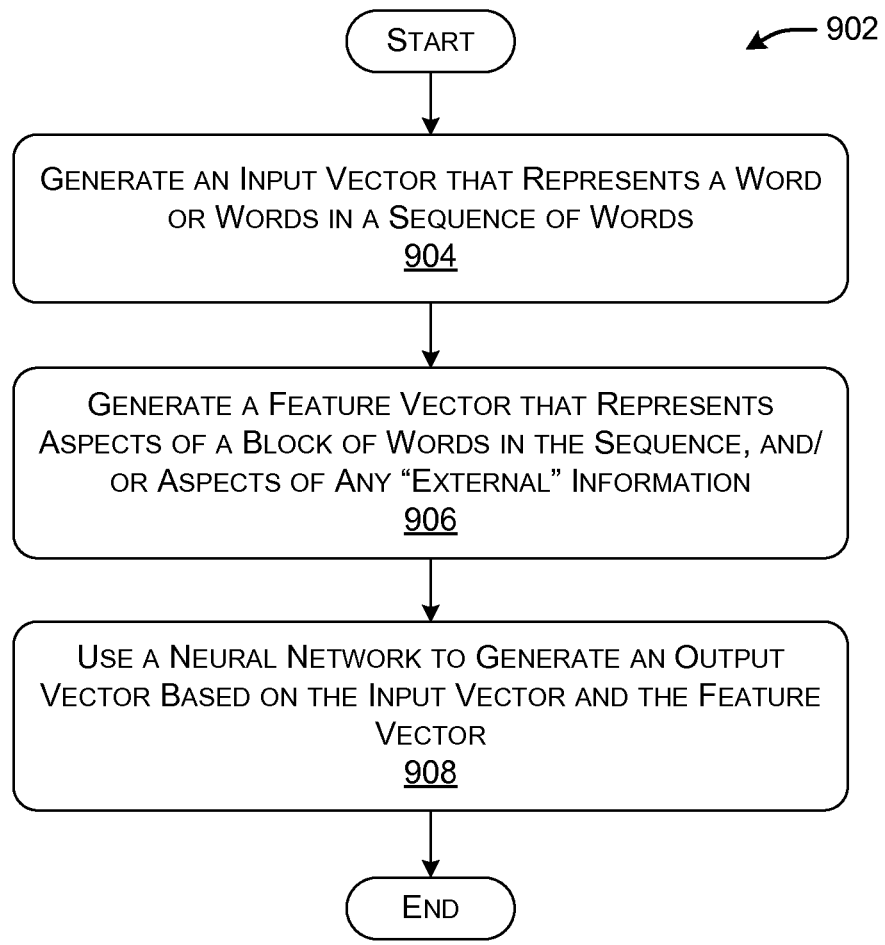
FIG. 9 shows a procedure that explains one manner of using the system of FIG. 1 to interpret a sequence of words. This procedure applies to several application scenarios.

Starting with FIG. 9, this figure is a procedure 902 which provides an overview of many applications which involve using the neural network 104 to provide some kind of interpretation of a collection of input words. In block 904, the system 102 generates an input vector that represents a word or words in the sequence of words. In block 906, the system 102 may generate a feature vector that represents any context information that pertains to the input information. For example, as described above, the system 102 can use LDA or LSA to identify topics associated within a document that is defined by the sliding block 212 of words. Alternatively, or in addition, the system 102 can rely on any of the external sources described in Section A to obtain the context information. In block 908, the system 102 uses the neural network 104 to provide an output vector, based on the input vector and the feature vector.

To cite just one application scenario that uses the procedure 902, the output vector may provide a reformulation of whatever language information is associated with the input vector. For example, the output vector may represent a reformulation of a search query in a search engine application or a document retrieval application. The system 102 can generate the feature vector based on aspects of the query itself and/or external information that pertains to the query. For example, assume that the user enters the query "tuition assistance at UW" into an Internet-hosted search engine. The system 102 can use the principles described above to determine that the query can be appropriately reformulated as "tuition assistance at University of Washington." This reformulation may ensue from the use of a feature vector that indicates that a user resides in the state of Washington (as opposed to Wisconsin, for example), or a feature vector that indicates that many of the user's previous queries pertain to the state of Washington, etc.

Figure 10:
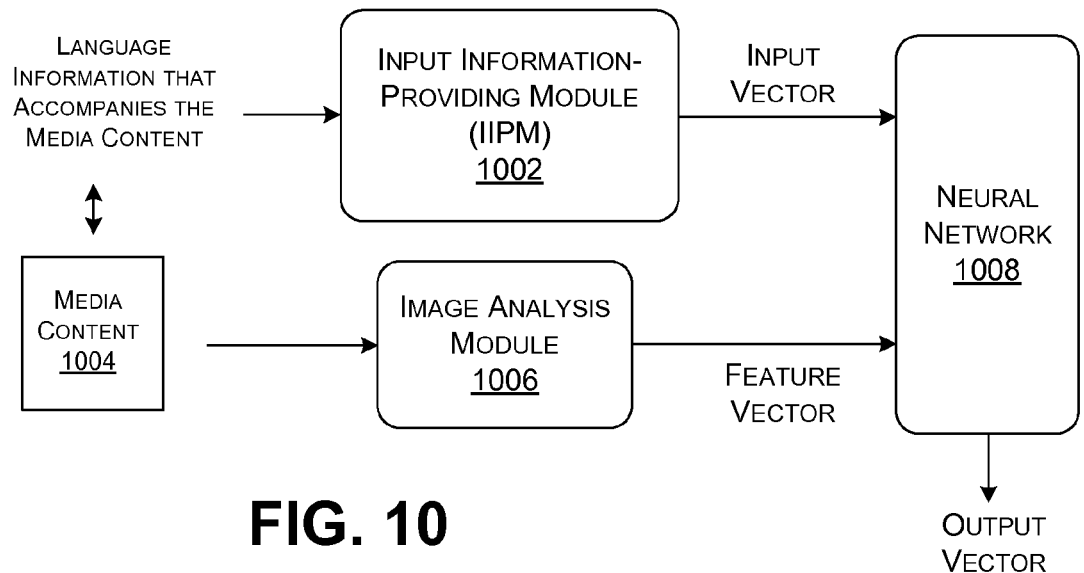
FIG. 10 shows functionality that uses the system of FIG. 1 to generate a feature vector that represents aspects of media content, such as an image or a video. The system generates output information that is conditioned on this feature vector.

FIG. 10 shows functionality that represents another application of the system 102 of FIG. 1. In this scenario, an input information-providing module (IIPM) 1002 receives language information that accompanies media content 1004. The media content 1004 may correspond to image content, video content, audio content, text content, graphical content, markup language content (e.g., "Web" content), etc., or any combination thereof. In one scenario, the IIPM 1002 may receive a user's description of the media content 1004. The user may supply that description in any form (e.g., in spoken form, text form, etc.) in the course of viewing the media content 1004. That description may correspond to the input language information. In another scenario, the IIPM 1002 may receive an audio stream which accompanies a presentation of the any kind of visual media content, such as an audio stream which is part of a video broadcast. That audio stream constitutes the language information. After receiving the language information, the IIPM 1002 generates an input vector which expresses at least part of the language information.

An analysis module 1006 analyzes the media content 1004 itself and generates a feature vector which describes characteristics of the media content 1004. For example, the analysis module 1006 can use image analysis techniques to generate Scale Invariant Feature Transform (SIFT) features for image media content. Or the analysis module 1006 may use vision recognition functionality to detect aspects of video media content, and so on.

A neural network 1008 can then generate an output vector based on the input vector and the feature vector. In a speech recognition application, the output vector may represent an interpretation of spoken language information. The feature vector, which complements the language information, may help disambiguate the spoken language information.

Figure 11:
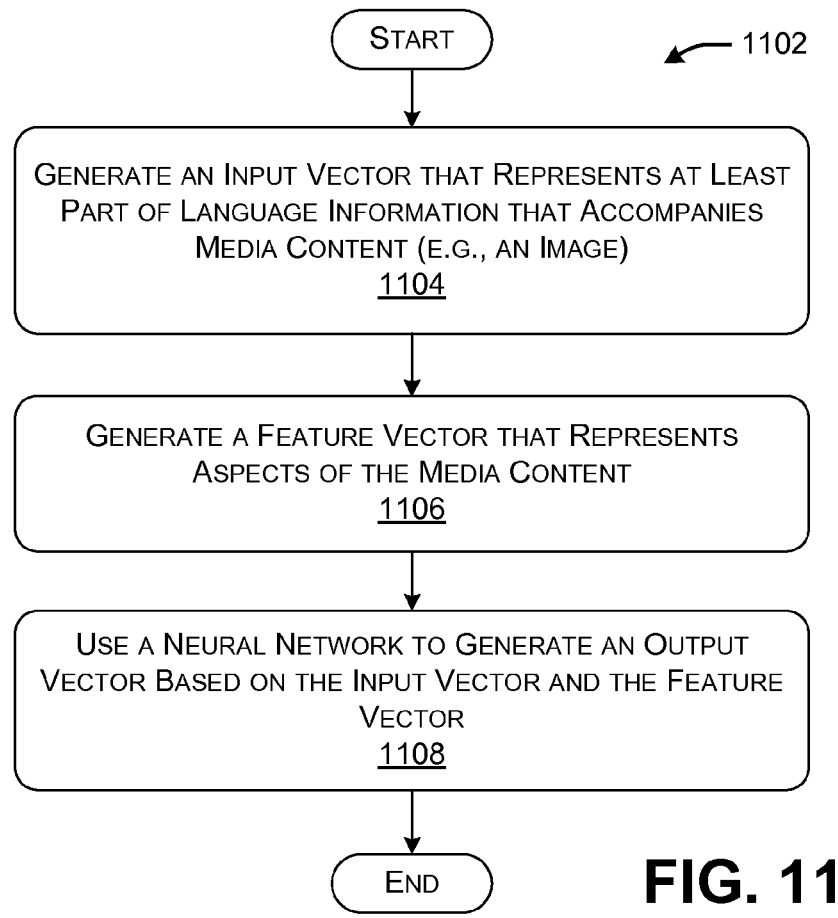
FIG. 11 shows a procedure that represents one manner of operation of the functionality of FIG. 10.

FIG. 11 shows a procedure 1102 which summarizes the operation of the functionality shown in FIG. 10. In block 1104, the IIPM 112 generates an input vector that represents at least part of language information, where that language information accompanies the media content 1004. In block 1106, the analysis module 1006 generates a feature vector which describes the media content 1004, such as by providing SIFT features that describe image media content. In addition, another context information-providing module (not shown) may supply features relating to the description received by the IIPM 1002, and/or features derived from external sources. In block 1108, the neural network 1008 generates an output vector based on the input vector and the feature vector.

Figure 12:
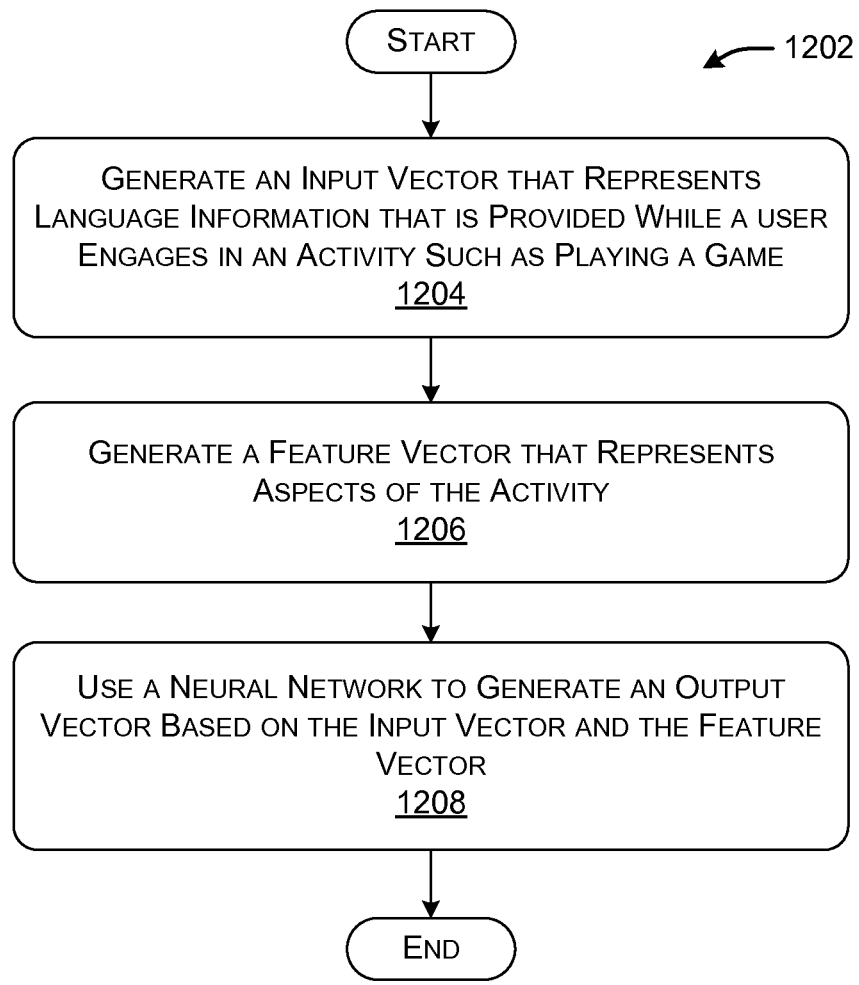
FIG. 12 shows a procedure that explains one manner of using the system of FIG. 1 to generate output information that is conditioned on an activity that a user is currently performing, such as playing a game.

FIG. 12 shows a procedure 1202 that represents another application of the system 102 of FIG. 1. In block 1204, the system 102 generates an input vector that represents language information that is input or otherwise provided while the user is engaging in a particular activity, such as playing a game. In block 1206, the system 102 generates a feature vector that expresses aspects of the activity with which the user is engaged. In block 1208, the system 102 uses the neural network 104 to generate an output vector which represents some interpretation of the language information, conditioned on knowledge gleaned from the feature vector.

For example, assume that the user is playing a game. Block 1206 may entail formulating a feature vector that identifies any of: the game that is being played; the state of the game that is being played; the individual(s) who are playing the game; all the commands that can be invoked in the game; the game-playing habits exhibited by the user, and so on. More specifically, for example, block 1206 may entail forming a collection of commands that can be invoked in a particular game. This collection may be treated as a document. Block 1206 may then involve analyzing this document using LDA, LSA, or some other technique. This analysis may help identify the nature of the game that is being played, insofar as commands associated with different genres tend to forms identifiable clusters.

Figure 13:
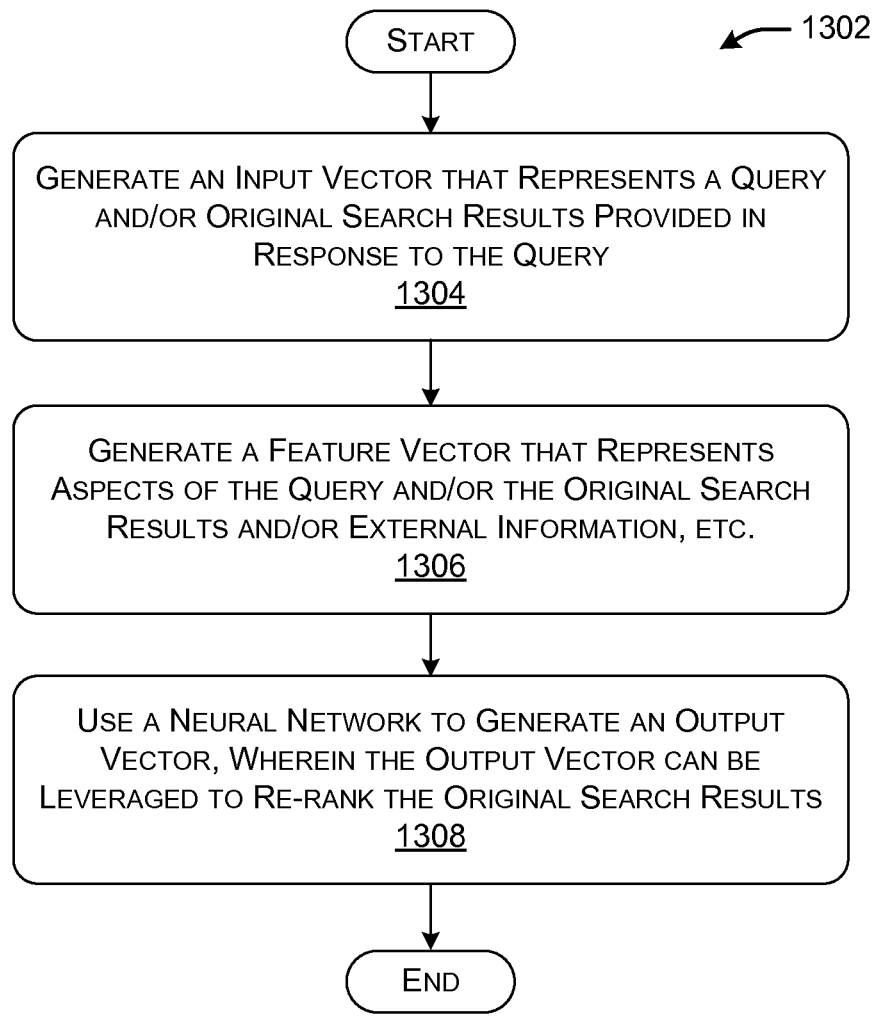
FIG. 13 shows a procedure that explains one manner of using the system of FIG. 1 to re-rank search results.

FIG. 13 shows a procedure 1302 that represents another application of the system 102 of FIG. 1. In block 1304, the system 102 generates an input vector that represents a query, and/or an aspect of original search results that are provided in response to submission of the query to a search engine. In block 1306, the system 102 generates a feature vector that represents any of: aspects of the query; aspects of the original search results; and/or any external information extracted from external sources (examples of which were cited in Section A). In block 1308, the system 102 can use the neural network 104 to generate an output vector based on the input vector and the feature vector. The system 102 can leverage the output information expressed by the output vector to provide revised search results.

The system 102 can perform re-ranking in many different ways, depending on the nature of the neural network's model 106 that is produced in the training operation. In one case, the model 106 maps queries to document content that will likely satisfy the queries, given a specified kind of context information. In the real-time execution phase, the system 102 can leverage the model 106 to identify document content that is most likely to satisfy a current identified query, given particular context information. The system 102 can then use that knowledge to re-rank the retrieved documents.

Figure 14:
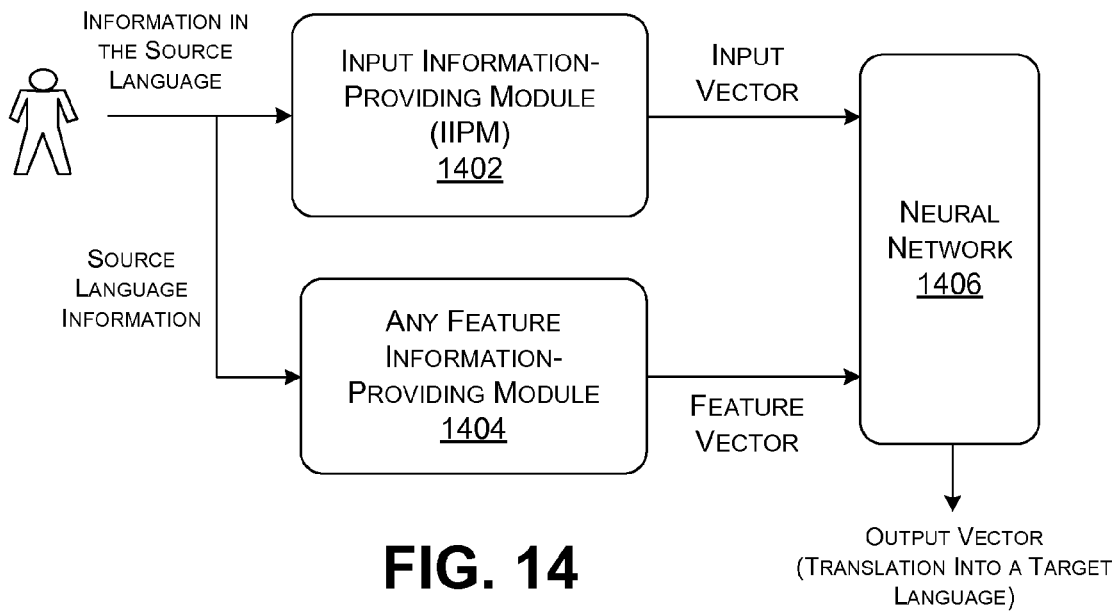
FIG. 14 shows functionality that uses the system of FIG. 1 to translate source language information into corresponding target language information, conditioned a feature vector which represents the source language information. In this implementation, the neural network performs all principal aspects of the translation operation.

FIG. 14 shows functionality that represents another application of the system 102 of FIG. 1, here applied to the translation of language information expressed in a source language ("source language information") to corresponding language information expressed in a target language ("target language information"). An input information-providing module (IIPM) 1402 generates an input vector based on some part of the source language information. A feature information-providing module 1404 generates a feature vector based on any aspect of the source language information, e.g., using LDA, LSA, etc. In addition, the feature information-providing module can optionally provide features that are derived from external sources. A neural network 1406 uses the input vector and the feature vector to generate an output vector which represents a translation of the source language information into the target language.

Overall, the neural network 1406 of FIG. 14 performs all principal aspects of the translation operation. For example, the neural network 1406 can replace both the lookup functionality and language model functionality that are traditionally used in a machine translation system that performs phrase-based translation. That is, the neural network 1406 performs both of these functions.

Figure 15:
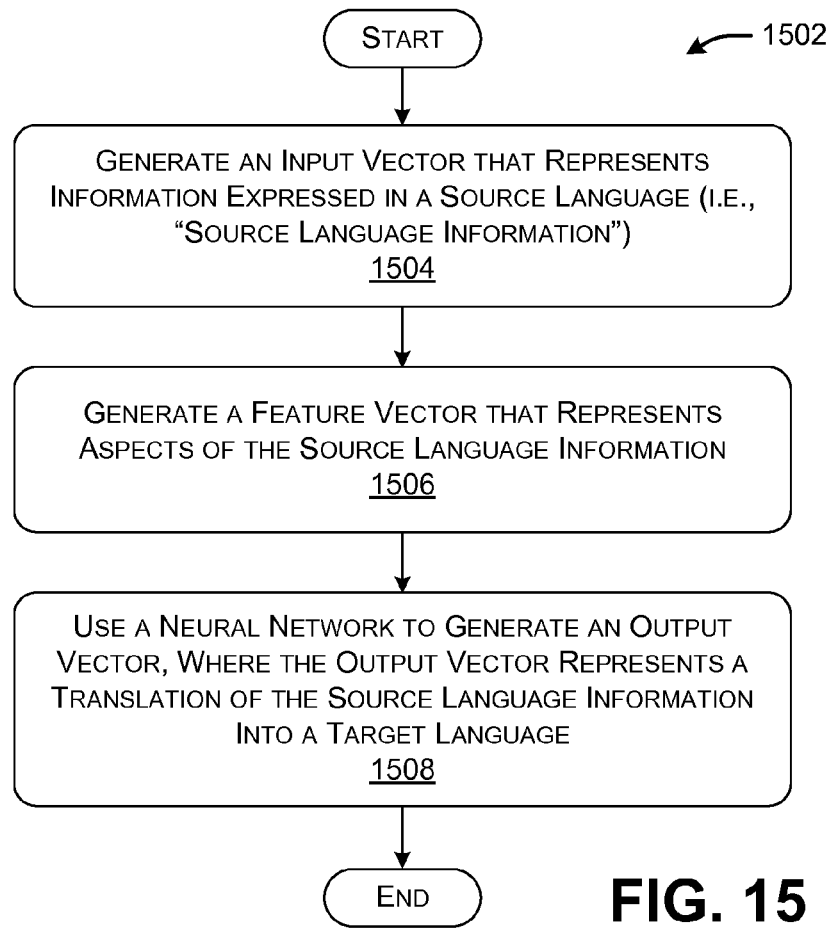
FIG. 15 shows a procedure that explains one manner of operation of the functionality of FIG. 14.

FIG. 15 shows a procedure 1502 that summarizes one manner of operation of the functionality of FIG. 14. In block 1504, the IIPM 1402 receives source language information. In block 1506, the feature information-providing module 1404 forms a feature vector that represents aspects of the source language information, with or without taking into consideration information supplied by external sources. In block 1508, the neural network 1406 generates an output vector which represents a translation of the source language information into a target language.

Figure 16:
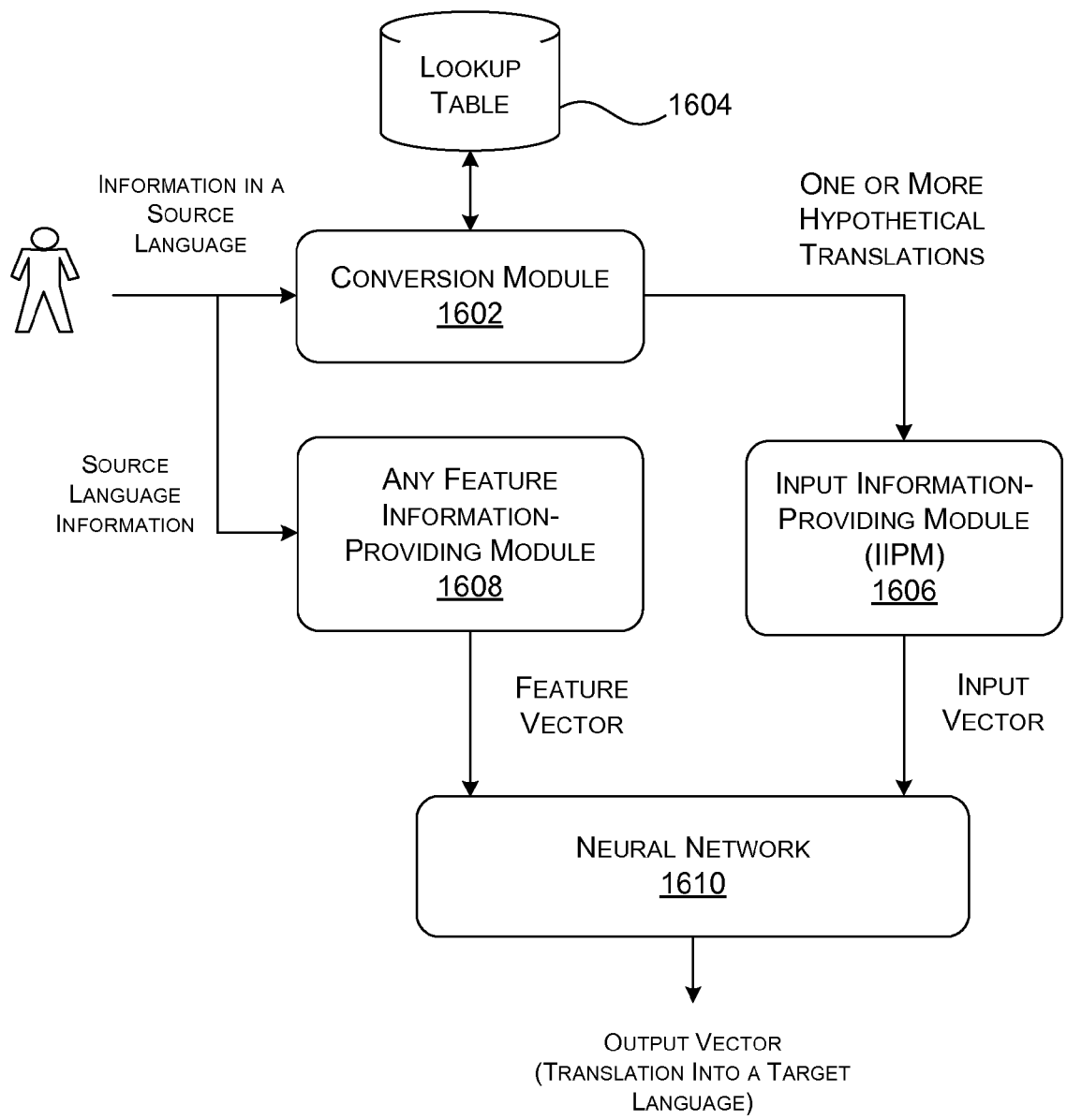
FIG. 16 shows another implementation of functionality that translates source language information into target language information. In this implementation, the neural network performs part of the translation operation, but not the entirety of the translation operation.

FIG. 16 shows functionality that represents another translation-related application of the system 102 of FIG. 1. A conversion module 1602 receives at least part of source language information. The conversion module 1602 converts one or more words in the source language information into corresponding hypotheses expressed in the target language. That is, each hypothesis describes a possible translation of the source language word(s) into the target language, together with a probability associated with that hypothesis. The conversion module 1602 can perform this task using a lookup table provided in a data store 1604. An input information-providing module (IIPM) 1606 then forms an input vector that represents at least the translation hypotheses. A feature information-providing module 1608 forms a feature vector based, at least in part, on the source language information. Finally, a neural network 1610 generates an output vector based on the input vector and the feature vector. The output vector represents a translation of the source language information into the target language.

In the example of FIG. 16, the neural network 1610 is used to replace the language model of a traditional phrase-based machine translation system, which often corresponds to an n-gram language model. But the neural network 1610 does not replace the lookup functionality. Accordingly, in contrast to the example of FIG. 14, the neural network 1610 does not perform all aspects of a phrase-based translation operation.

Figure 17:
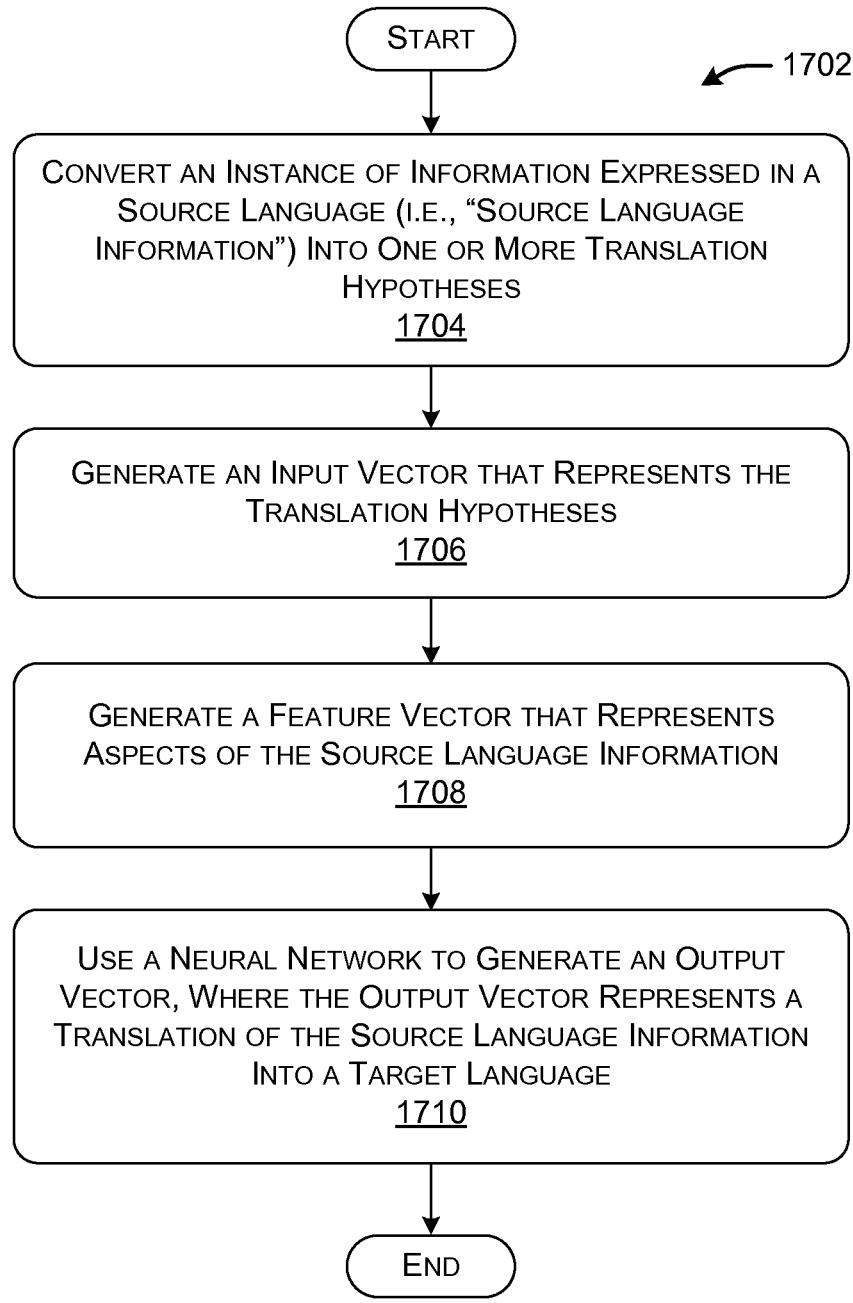
FIG. 17 shows a procedure that explains one manner of operation of the functionality of FIG. 16.

FIG. 17 shows a procedure 1702 which summarizes one manner of operation of the functionality shown in FIG. 16. In block 1704, the functionality converts an instance of source language information into one or more hypotheses expressed in a target language, together with probability information associated with the hypotheses. In block 1706, the functionality forms an input vector based at least on the hypotheses. In block 1708, the functionality forms a feature vector that represents at least aspects of the source language information. In block 1710, the functionality generates an output vector which represents a translation of the source language information into the target language, as conditioned by the context information provided by the feature vector.

To repeat, the applications identified above are cited by way of illustration, not limitation. Other implementations can leverage the system 102 of FIG. 1 to provide other applications.

D. Representative Computing Functionality

FIG. 18 shows one implementation of the system 102 of FIG. 1. Here, local computing functionality 1802 implements all aspects of the system 102. The local computing functionality 1802 may correspond to a personal computer device, a laptop computing device, a tablet-type computing device, a portable telephone device (e.g., a smart phone device), a game console device, a set-top box device, and so on.

FIG. 19 shows another implementation of the system 102 of FIG. 1 in which the functions of the system 102 can be distributed between local computing functionality 1902 and remote computing functionality 1904 in any manner. To illustrate this point, FIG. 19 indicates that the local functionality 1902 includes system functionality 102A, while the remote functionality 1904 includes system functionality 102B. The local computing functionality 1902 can be implemented using any device described above with respect to FIG. 18. The remote computing functionality 1904 can be implemented by one or more servers together with one or more data stores. A communication conduit 1906 may couple the local computing functionality 1902 and the remote computing functionality 1904. The communication conduit 1906 can represent any communication mechanism, such as a local area network, a wide area network (such as the Internet), a point-to-point connection, and so on.

To cite one particular case, all of the functions of the system 102 may be implemented by the remote computing functionality 1904. The user may interact with the remote computing functionality 1904 using the local computing functionality 1902, via the communication conduit 1906. In another case, the remote computing functionality 1904 can implement just the training aspects of the functions shown in FIG. 1. The remote computing functionality 1904 can then download the model 106 that is produced by the training operation to the local computing functionality 1902. Thereafter, the local computing functionality 1902 can use the model 106 to process input information using the neural network 104.

FIG. 20 shows illustrative computing functionality 2000 that can be used to implement any aspect of the functions described above. For example, the type of computing functionality 2000 shown in FIG. 20 can be used to implement any aspect of the system 102 of FIG. 1, as implemented by the functionality of FIG. 18, FIG. 19, or some other embodiment. In one case, the computing functionality 2000 may correspond to any type of computing device that includes one or more processing devices. In all cases, the computing functionality 2000 represents one or more physical and tangible processing mechanisms.

The computing functionality 2000 can include volatile and non-volatile memory, such as RAM 2002 and ROM 2004, as well as one or more processing devices 2006 (e.g., one or more CPUs, and/or one or more GPUs, etc.). The computing functionality 2000 also optionally includes various media devices 2008, such as a hard disk module, an optical disk module, and so forth. The computing functionality 2000 can perform various operations identified above when the processing device(s) 2006 execute instructions that are maintained by memory (e.g., RAM 2002, ROM 2004, or elsewhere).

More generally, instructions and other information can be stored on any computer readable medium 2010, including, but not limited to, static memory storage devices, magnetic storage devices, optical storage devices, and so on. The term computer readable medium also encompasses plural storage devices. In many cases, the computer readable medium 2010 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2000 also includes an input/output module 2012 for receiving various inputs (via input devices 2014), and for providing various outputs (via output devices). Illustrative input devices include a keyboard device, a mouse input device, a touchscreen input device, a gesture input device, a voice recognition mechanism, and so on. One particular output mechanism may include a presentation device 2016 and an associated graphical user interface (GUI) 2018. The computing functionality 2000 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area network, a wide area network (e.g., the Internet), a point-to-point connection, etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed using one or more processing devices, the method comprising:
    receiving a word input vector at an input layer of a neural network, the word input vector representing an individual word from an input sequence of words;
    receiving a topic feature vector at the input layer of the neural network, the topic feature vector being separate from the word input vector and representing topics expressed in the input sequence of words;
    using the neural network to generate an output vector at an output layer of the neural network based at least on the word input vector and the topic feature vector, wherein using the neural network includes, by a hidden layer of the neural network:
        modifying the word input vector using a first learned matrix; and
        modifying the topic feature vector using a second learned matrix that is separate from the first learned matrix,
    wherein the output vector represents a word probability given the word input vector and the topic feature vector; and
    performing a natural language processing operation based at least on the word probability represented by the output vector.

2. The method of claim 1, wherein using the neural network includes:
    by the hidden layer of the neural network, modifying a time-delayed hidden-state vector with a third learned matrix, wherein the time-delayed hidden-state vector represents an output of the hidden layer in a prior time instance,
    wherein the word input vector, the topic feature vector, and the time-delayed hidden-state vector are separate vectors, and
    wherein the first learned matrix, the second learned matrix, and the third learned matrix are separate matrices.

3. The method of claim 2, wherein using the neural network includes, by the output layer of the neural network:
    modifying the output of the hidden layer with a fourth learned matrix; and
    modifying the topic feature vector with a fifth learned matrix,
    wherein the first learned matrix, the second learned matrix, the third learned matrix, the fourth learned matrix, and the fifth learned matrix are separate matrices.

4. The method of claim 2, wherein using the neural network includes, by the hidden layer:
    performing a first multiplication operation of the word input vector by the first learned matrix to generate a first multiplication output;
    performing a second multiplication operation of the topic feature vector by the second learned matrix to generate a second multiplication output;
    performing a third multiplication operation of the time-delayed hidden-state vector by the third learned matrix to generate a third multiplication output; and summing the first multiplication output, the second multiplication output, and the third multiplication output to generate the output of the hidden layer.

5. The method of claim 1, further comprising:
generating the topic feature vector using a Latent Dirichlet Allocation (LDA) technique; and
as subsequent words from the input sequence are processed using the neural network, incrementally generating next topic feature vectors based at least on previous feature vectors.

6. The method of claim 5, wherein said incrementally generating comprises applying a decay factor to previous topic feature vectors for previous words that have already been processed by the neural network.

7. The method of claim 1, wherein the input sequence of words is part of an input document.

8. A system comprising:
at least one processing device; and
at least one computer readable medium storing instructions which, when executed by the at least one processing device, cause the at least one processing device to:
receive a word input vector at an input layer of a neural network, the word input vector representing an individual word from an input sequence of words;
receive a topic feature vector at the input layer of the neural network, the topic feature vector being separate from the word input vector and representing topics expressed in the input sequence of words;
use the neural network to generate an output vector at an output layer of the neural network based at least on the word input vector and the topic feature vector, wherein using the neural network includes, by a hidden layer of the neural network:
modifying the word input vector using a first learned matrix; and
modifying the topic feature vector using a second learned matrix that is separate from the first learned matrix,
wherein the output vector represents a word probability given the word input vector and the topic feature vector; and
perform a natural language processing operation based at least on the word probability represented by the output vector.

9. The system of claim 8, wherein the instructions, when executed by the at least one processing device, cause the at least one processing device to:
by the hidden layer of the neural network, modify a time-delayed hidden-state vector with a third learned matrix,
wherein the time-delayed hidden-state vector represents an output of the hidden layer in a prior time instance,
wherein the word input vector, the topic feature vector, and the time-delayed hidden-state vector are separate vectors, and
wherein the first learned matrix, the second learned matrix, and the third learned matrix are separate matrices.

10. The system of claim 9, wherein the instructions, when executed by the at least one processing device, cause the at least one processing device to:
by the output layer of the neural network:
modify the output of the hidden layer with a fourth learned matrix; and
modify the topic feature vector with a fifth learned matrix,
wherein the first learned matrix, the second learned matrix, the third learned matrix, the fourth learned matrix, and the fifth learned matrix are separate matrices.

11. The system of claim 9, wherein the instructions, when executed by the at least one processing device, cause the at least one processing device to:
by the hidden layer of the neural network:
perform a first multiplication operation of the word input vector by the first learned matrix to generate a first multiplication output;
perform a second multiplication operation of the topic feature vector by the second learned matrix to generate a second multiplication output;
perform a third multiplication operation of the time-delayed hidden-state vector by the third learned matrix to generate a third multiplication output; and
sum the first multiplication output, the second multiplication output, and the third multiplication output to generate the output of the hidden layer.

12. The system of claim 8, wherein the instructions, when executed by the at least one processing device, cause the at least one processing device to:
generate the topic feature vector using a Latent Dirichlet Allocation (LDA) technique; and
as subsequent words from the input sequence are processed using the neural network, incrementally generate next topic feature vectors based at least on previous feature vectors.

13. The system of claim 12, wherein the instructions, when executed by the at least one processing device, cause the at least one processing device to:
apply a decay factor to previous topic feature vectors for previous words that have already been processed by the neural network.

14. The system of claim 8, wherein the input sequence of words is part of an input document.

15. At least one computer readable storage medium storing instructions which, when executed by at least one processing device, cause the at least one processing device to perform acts comprising:
receiving a word input vector at an input layer of a neural network, the word input vector representing an individual word from an input sequence of words;
receiving a topic feature vector at the input layer of the neural network, the topic feature vector being separate from the word input vector and representing topics expressed in the input sequence of words;
using the neural network to generate an output vector at an output layer of the neural network based at least on the word input vector and the topic feature vector, wherein using the neural network includes, by a hidden layer of the neural network:
modifying the word input vector using a first learned matrix; and
modifying the topic feature vector using a second learned matrix that is separate from the first learned matrix,
wherein the output vector represents a word probability given the word input vector and the topic feature vector; and
performing a natural language processing operation based at least on the word probability represented by the output vector.

16. The at least one computer readable storage medium of claim 15, wherein using the neural network includes:

by the hidden layer of the neural network, modifying a time-delayed hidden-state vector with a third learned matrix, wherein the time-delayed hidden-state vector represents an output of the hidden layer in a prior time instance, wherein the word input vector, the topic feature vector, and the time-delayed hidden-state vector are separate vectors, and wherein the first learned matrix, the second learned matrix, and the third learned matrix are separate matrices.

17. The at least one computer readable storage medium of claim 16, wherein using the neural network includes, by the output layer of the neural network:

modifying the output of the hidden layer with a fourth learned matrix; and modifying the topic feature vector with a fifth learned matrix, wherein the first learned matrix, the second learned matrix, the third learned matrix, the fourth learned matrix, and the fifth learned matrix are separate matrices.

18. The at least one computer readable storage medium of claim 16 wherein using the neural network includes, by the hidden layer:

performing a first multiplication operation of the word input vector by the first learned matrix to generate a first multiplication output;

performing a second multiplication operation of the topic feature vector by the second learned matrix to generate a second multiplication output;

performing a third multiplication operation of the time-delayed hidden-state vector by the third learned matrix to generate a third multiplication output; and summing the first multiplication output, the second multiplication output, and the third multiplication output to generate the output of the hidden layer.

19. The at least one computer readable storage medium of claim 15, the acts further comprising:

generating the topic feature vector using a Latent Dirichlet Allocation (LDA) technique; and as subsequent words from the input sequence are processed using the neural network, incrementally generating next topic feature vectors based at least on previous feature vectors.

20. The at least one computer readable storage medium of claim 19, wherein said incrementally generating comprises applying a decay factor to previous topic feature vectors for previous words that have already been processed by the neural network.

* * * * *